United States Patent
Gao et al.

(10) Patent No.: US 11,438,041 B2
(45) Date of Patent: Sep. 6, 2022

(54) METHODS AND DEVICES FOR REDUCING CHANNEL STATE INFORMATION FEEDBACK OVERHEAD

(71) Applicant: NEC CORPORATION, Tokyo (JP)

(72) Inventors: Yukai Gao, Beijing (CN); Gang Wang, Beijing (CN)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 17/264,623

(22) PCT Filed: Aug. 3, 2018

(86) PCT No.: PCT/CN2018/098659
§ 371 (c)(1),
(2) Date: Jan. 29, 2021

(87) PCT Pub. No.: WO2020/024289
PCT Pub. Date: Feb. 6, 2020

(65) Prior Publication Data
US 2021/0306041 A1  Sep. 30, 2021

(51) Int. Cl.
*H04B 7/02* (2018.01)
*H04B 7/0456* (2017.01)
*H04B 7/06* (2006.01)

(52) U.S. Cl.
CPC ......... *H04B 7/0478* (2013.01); *H04B 7/0639* (2013.01); *H04B 7/0658* (2013.01)

(58) Field of Classification Search
CPC ... H04B 7/0478; H04B 7/0658; H04B 7/0639
(Continued)

(56) References Cited

U.S. PATENT DOCUMENTS

2011/0249713 A1* 10/2011 Hammarwall ......... H04B 7/065
375/220
2013/0107920 A1* 5/2013 Kim .................... H04B 7/0456
375/219
(Continued)

FOREIGN PATENT DOCUMENTS

CN  108141317 A  6/2018
CN  108352888 A  7/2018

OTHER PUBLICATIONS

LG Electronics, "Discussions on CSI reporting contents", 3GPP TSG RAN WG1 Meeting #90, R1-1713145, Aug. 25, 2017, 5 pages.
(Continued)

*Primary Examiner* — Helene E Tayong
(74) *Attorney, Agent, or Firm* — Sughrue Mion, PLLC

(57) ABSTRACT

Embodiments of the present disclosure relate to methods, devices and computer readable mediums for reducing channel state information (CSI) feedback overhead. In example embodiments, a method implemented at a terminal device includes receiving a codebook configuration and a reference signal from a network device the codebook configuration indicating at least one codebook subset restriction (CBSR); determining, based on reference signal at least one precoding matrix indicator (PMI) associated with a plurality of beams of a set of beams between the terminal device and the network device selected at least partially based on the at least one CBSR; and transmitting the at least one PMI to the network device.

13 Claims, 5 Drawing Sheets

(58) Field of Classification Search
USPC .......................................................... 375/267
See application file for complete search history.

(56) References Cited

U.S. PATENT DOCUMENTS

| | | | |
|---|---|---|---|
| 2013/0114656 A1* | 5/2013 | Sayana .................. | H04B 7/024 |
| | | | 375/219 |
| 2016/0294454 A1* | 10/2016 | Onggosanusi ....... | H04B 7/0478 |
| 2016/0323022 A1* | 11/2016 | Rahman ............... | H04B 7/0478 |
| 2017/0041051 A1 | 2/2017 | Rahman et al. | |
| 2018/0167117 A1* | 6/2018 | Liu ........................ | H04B 7/063 |
| 2018/0227029 A1* | 8/2018 | Nammi ................ | H04B 7/0647 |
| 2018/0287682 A1* | 10/2018 | Kwak ................... | H04B 7/0695 |
| 2019/0028158 A1* | 1/2019 | Park ..................... | H04B 7/0478 |
| 2020/0195319 A1* | 6/2020 | Park .................. | H04W 72/1226 |

OTHER PUBLICATIONS

Huawei et al., "General framework for CSI acquisition and beam management", 3GPP TSG RAN WGI Meeting #90, R1-1712226, Aug. 25, 2017, 10 pages.
International Search Report for PCT/CN2018/098659 dated Mar. 27, 2019 [PCT/ISA/210].
Written Opinion for PCT/CN2018/098659 dated Mar. 27, 2019 [PCT/ISA/237].
Notification of Reason for Refusal dated Jul. 5, 2022 in Japanese Application 2021-505199.

* cited by examiner

METHODS AND DEVICES FOR REDUCING CHANNEL STATE INFORMATION FEEDBACK OVERHEAD

CROSS REFERENCE TO RELATED APPLICATIONS

This application is a National Stage of International Application No. PCT/CN2018/098659 filed Aug. 3, 2018.

TECHNICAL FIELD

Embodiments of the present disclosure generally relate to the field of telecommunication, and in particular, to methods and devices for reducing channel state information (CSI) feedback overhead.

BACKGROUND

Communication technologies have been developed in various telecommunication standards to provide a common protocol that enables different wireless devices to communicate on a municipal, national, regional, and even global level. An example of an emerging telecommunication standard is new radio (NR), for example, 5G radio access. Currently, the study of NR system was approved. The NR will consider frequency ranges up to 100 GHz with the objective of a single technical framework addressing all usage scenarios, requirements and deployment scenarios defined in TR38.913 including enhanced mobile broadband, massive machine-type-communications, and ultra-reliable and low latency communications.

A multi-antenna scheme for new radio access is provided to focus on the following aspects including multi-antenna scheme, beam management, CSI acquisition and Reference signal and QCL. Furthermore, a Type II codebook was agreed in NR. However, the calculation complexity and feedback overhead for type II codebook is very large. Although the Codebook subset restriction (CBSR) was agreed for type II codebook, the calculation complexity can be reduced, while the feedback overhead is not changed.

SUMMARY

In general, example embodiments of the present disclosure provide methods and devices for reducing channel state information (CSI) feedback overhead.

In a first aspect, there is provided a method implemented at a terminal device. The method comprises receiving a codebook configuration and a reference signal from a network device the codebook configuration indicating at least one codebook subset restriction (CBSR); determining, based on reference signal at least one precoding matrix indicator (PMI) associated with a plurality of beams of a set of beams between the terminal device and the network device selected at least partially based on the at least one CBSR; and transmitting the at least one PMI to the network device.

In a second aspect, there is provided a method implemented at a network device. The method comprises transmitting a codebook configuration and a reference signal to a terminal device, the codebook configuration indicating at least one codebook subset restriction (CBSR); and receiving at least one precoding matrix indicator (PMI) associated with a plurality of beams of a set of beams between the terminal device and the network device selected at least partially based on the at least one CBSR, the at least one PMI being determined based on the reference signal by the terminal device.

In a third aspect, there is provided a terminal device. The device includes a processor; and a memory coupled to the processing unit and storing instructions thereon, the instructions, when executed by the processing unit, causing the device to perform the method according to the first aspect.

In a fourth aspect, there is provided a network device. The device includes a processor; and a memory coupled to the processing unit and storing instructions thereon, the instructions, when executed by the processing unit, causing the device to perform the method according to the second aspect.

In a fifth aspect, there is provided a computer readable medium having instructions stored thereon, the instructions, when executed on at least one processor, causing the at least one processor to carry out the method according to the first aspect.

In a sixth aspect, there is provided a computer readable medium having instructions stored thereon, the instructions, when executed on at least one processor, causing the at least one processor to carry out the method according to the second aspect.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a NodeB in new radio access (gNB), a next generation NodeB (gNB), a Remote Radio Unit (RRU), a radio head (RH), a remote radio head (RRH), a low power node such as a femto node, a pico node, and the like. For the purpose of discussion, in the following, some embodiments will be described with reference to eNB as examples of the network device.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

Figure 1:
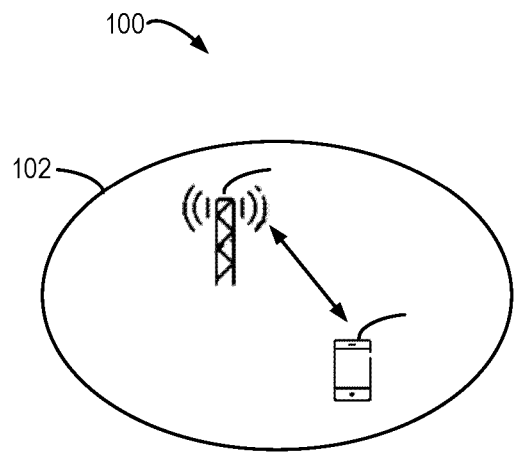
FIG. 1 is a block diagram of a communication environment in which embodiments of the present disclosure can be implemented.

FIG. 1 shows an example communication network 100 in which implementations of the present disclosure can be implemented. The network 100 includes a network device 110 and a terminal device 120 served by the network device 110. The serving area of the network device 110 is called as a cell 102. It is to be understood that the number of network devices and terminal devices is only for the purpose of illustration without suggesting any limitations. The network 100 may include any suitable number of network devices and terminal devices adapted for implementing implementations of the present disclosure. Although not shown, it is to be understood that one or more terminal devices may be located in the cell 102 and served by the network device 110.

In the communication network 100, the network device 110 can communicate data and control information with the terminal device 120. A link from the network device 110 to the terminal device 120 is referred to as a downlink (DL) or a forward link, while a link from the terminal device 120 to the network device 110 is referred to as an uplink (UL) or a reverse link.

Depending on the communication technologies, the network 100 may be a Code Division Multiple Access (CDMA) network, a Time Division Multiple Address (TDMA) network, a Frequency Division Multiple Access (FDMA) network, an Orthogonal Frequency-Division Multiple Access (OFDMA) network, a Single Carrier-Frequency Division Multiple Access (SC-FDMA) network or any others. Communications discussed in the network 100 may use conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols. The techniques described herein may be used for the wireless networks and radio technologies mentioned above as well as other wireless networks and radio technologies. For clarity, certain aspects of the techniques are described below for LTE, and LTE terminology is used in much of the description below.

In communications, the terminal device 120 is configured to estimate and report channel state information (CSI) of a communication channel between the terminal device 120 and the network device 110. The CSI can be determined by the terminal device 120 using downlink reference signals transmitted by the network device 110.

Generally, LTE utilizes an implicit rank indicator/precoding matrix indicator/resource partitioning information/channel quality indicator (RI/PMI/RPI/CQI) feedback framework for the CSI feedback. The CSI feedback framework is "implicit" in the form of CQI/PMI/RI (and CRI in the LTE specification) derived from a codebook.

RI (Rank Indicator) is information on a channel rank as described above and indicates the number of streams/layers that can be received via the same time-frequency resource. Since RI is determined by long-term fading of a channel, it may be generally fed back at a cycle longer than that of PMI (Precoding Matrix Indicator) or CQI (Channel Quality Indicator). PMI is a value indicating a spatial characteristic of a channel and indicates a precoding matrix index of the network device preferred by the terminal device. RPI (Relative Power Indicator) is corresponding to power domain resource assignments between different beams/layers indicated by PMI or different ports. ACI (Amplitude Coefficient Indicator) is the amplitude parameter for the beams/layers and the amplitude coefficient indicators may be wideband or subband. PCI (Phase Coefficient Indicator) is the amplitude parameter for the beams/layers, and the phase coefficient indicators may be wideband or subband. CQI is information indicating the strength of a channel and indicates a reception SINR obtainable when the network device uses PMI.

The CSI feedback reflects average channel conditions over the overall or part of a whole configured bandwidth (for example, wideband). For example, the configured bandwidth may be the bandwidth of CSI-RS (Channel State Information-Reference Signal). For another example, the configured bandwidth may be the bandwidth configured for reporting. Some metrics, such as RI, PMI, ACI, PCI and RPI, may be computed to reflect the average channel conditions across the whole configured bandwidth (e.g., wideband RI/PMI/ACI). The wideband PMI may indicate an index of a beam for the whole configured bandwidth, and the wideband ACI may indicate a gain of the beam across the whole configured bandwidth. Some metrics, such as PMI and CQI, may be computed per subband (for example, a part of the whole configured bandwidth). The PMI for a subband may indicate a gain of the beam in the subband, and the ACI for a subband may indicate a amplitude coefficient of the beam in the subband and the PCI for a subband may indicate a phase coefficient of the beam in the subband.

When the terminal device 120 reports CSI for more than one beam (for example, L beams). Information for the beams is required to determine the codeword from a codebook. The codebook may be supported for layer 1 and layer 2. For example, the codeword in this case can be defined by the terminal device 120 depending on information of different beams, for example as below:

For layer 1 $W^{(1)}_{q_1,q_2,n_1,n_2,p_l^{(1)},p_l^{(2)},i_{2,1,1}} = W^1_{q_1,q_2,n_2,n_2,p_1^{(1)},p_1^{(2)},i_{2,1,1}}$ (1)

For layer 2 (2)

$W^{(2)}_{q_1,q_2,n_2,n_2,p_1^{(1)},p_1^{(2)},i_{2,1,1},p_2^{(1)},p_2^{(2)},i_{2,1,2}} =$ $\frac{1}{\sqrt{2}} \left[ W^1_{q_1,q_2,n_2,n_2,p_1^{(1)},p_1^{(2)},i_{2,1,1}} \quad W^2_{q_1,q_2,n_2,n_2,p_2^{(1)},p_2^{(2)},i_{2,1,2}} \right]$ Where $W^{(l)}_{q_1,q_2,n_1,n_2,p_l^{(1)},p_l^{(2)},c_l} =$ (3)

$\frac{1}{\sqrt{N_1 N_2 \sum_{i=0}^{2L-1} (p_{l,i}^{(1)} p_{l,i}^{(2)})^2}} \begin{bmatrix} \sum_{i=0}^{L-1} v_{m_1^{(i)},m_2^{(i)}} p_{l,i}^{(1)} p_{l,i}^{(2)} \varphi_{l,i} \\ \sum_{i=0}^{L-1} v_{m_1^{(i)},m_2^{(i)}} p_{l,i+L}^{(1)} p_{l,i+L}^{(2)} \varphi_{l,i+L} \end{bmatrix}$, $l = 1, 2$ Where $q_1$ and $q_2$ represent indices corresponding to the first and second dimension (for example, horizontal and vertical direction) of the beam group; $n_1$ and $n_2$ may be regarded as indices corresponding to the first and second dimension (for example, horizontal and vertical direction) of the beams in the beam group; $p_l^{(1)}$ may be referred as a wideband amplitude parameter for each beam of L beams and $p_l^{(2)}$ may be referred as a amplitude parameter for each beam of L beams in a certain subband; $i_{2,1,1}$ represents subband phase parameters for each beam of L beams for the first layer in a certain subband, and $i_{2,1,2}$ represents subband phase parameters for each beam of L beams for the second layer in a certain subband; $N_1$ and $N_2$ are used to indicate the number of antenna ports in the first and second dimension of an antenna array at the network device, respectively; $v_{m_1^{(i)},m_2^{(i)}}$ represents a vector the L beams for a i-th layer; $m_1^{(i)}$ and $m_2^{(i)}$ are indices corresponding to the first and second dimension (for example, horizontal and vertical direction) of the i-th beam within L beams and can be used to identify the i-th beam; $v_{m_1^{(i)},m_2^{(i)}}$ may be regarded as a PMI for the i-th beam across a configured bandwidth (a wideband) in some examples; $p_{l,i}^{(1)}$ indicates a wideband amplitude coefficient of the i-th beam across the configured bandwidth, and $p_{l,i}^{(2)}$ indicates an amplitude coefficient of the i-th beam in a certain subband; $p_{l,i}^{(1)}$ and $p_{l,i}^{(2)}$ may be regarded as a ACI for the i-th beam across the wideband and in the certain subband, respectively; $\phi_{l,i}$ represents a phase coefficient of the i-th beam in a certain subband; $\phi_{l,i}$ may be regarded as a PCI for the i-th beam in the certain subband. l may be the index for layer. The codebook including a codeword such as in Equations (1)-(3) may be referred to as a type II codebook.

To allow the network device 110 to determine the codeword, for each of the L beams, parameters describes as above are needed to be reported by the terminal device 120, which will increase the overhead for CSI feedback.

As described above, some metrics, such as RI, PMI, ACI, PCI, and RPI, may be computed to reflect the average channel conditions. The following Table 1 shows the PMI of a type II codebook.

TABLE 1

| | PMI of codebookType = typeII | | | | | | | | | |
|---|---|---|---|---|---|---|---|---|---|---|
| | Information fields for wideband PMI | | | | | | Information fields per subband PMI | | | |
| | $i_{1,1}$ | $i_{1,2}$ | $i_{1,3,1}$ | $i_{1,4,1}$ | $i_{1,3,2}$ | $i_{1,4,2}$ | $i_{2,1,1}$ | $i_{2,1,2}$ | $i_{2,2,1}$ | $i_{2,2,2}$ |
| Rank = 1 SBAmp off | $\lceil \log_2(O_1 O_2) \rceil$ | $\left\lfloor \log_2 \binom{N_1 N_2}{L} \right\rfloor$ | $\lceil \log_2(2L) \rceil$ | $3(2L-1)$ | N/A | N/A | $(M_1-1) \cdot \log_2 N_{PSK}$ | N/A | N/A | N/A |
| Rank = 2 SBAmp off | $\lceil \log_2(O_1 O_2) \rceil$ | $\left\lfloor \log_2 \binom{N_1 N_2}{L} \right\rfloor$ | $\lceil \log_2(2L) \rceil$ | $3(2L-1)$ | $\lceil \log_2(2L) \rceil$ | $3(2L-1)$ | $(M_1-1) \cdot \log_2 N_{PSK}$ | $(M_2-1) \cdot \log_2 N_{PSK}$ | N/A | N/A |
| Rank = 1 SBAmp off | $\lceil \log_2(O_1 O_2) \rceil$ | $\left\lfloor \log_2 \binom{N_1 N_2}{L} \right\rfloor$ | $\lceil \log_2(2L) \rceil$ | $3(2L-1)$ | N/A | N/A | $\min(M_1, K^{(2)}) \cdot \log_2 N_{PSK} - \log_2 N_{PSK} + 2 \cdot (M_1 - \min(M_1, K^{(2)}))$ | N/A | $\min(M_1, K^{(2)}) - 1$ | N/A |
| Rank = 2 SBAmp off | $\lceil \log_2(O_1 O_2) \rceil$ | $\left\lfloor \log_2 \binom{N_1 N_2}{L} \right\rfloor$ | $\lceil \log_2(2L) \rceil$ | $3(2L-1)$ | $\lceil \log_2(2L) \rceil$ | $3(2L-1)$ | $\min(M_1, K^{(2)}) \cdot \log_2 N_{PSK} - \log_2 N_{PSK} + 2 \cdot (M_1 - \min(M_1, K^{(2)}))$ | $\min(M_2, K^{(2)}) \cdot \log_2 N_{PSK} - \log_2 N_{PSK} + 2 \cdot (M_2 - \min(M_2, K^{(2)}))$ | $\min(M_1, K^{(2)}) - 1$ | $\min(M_2, K^{(2)}) - 1$ |

As can be seen from Table 1, PMI may be referred to a wideband PMI and a subband PMI. For example, $i_{1,1}$ may be regarded an indication for a feedback of one beam group from $O_1 * O_2$ beam groups, wherein $O_1$ and $O_2$ are configured values for oversampling the spatial directions; $i_{1,2}$ may be regarded an indication for a feedback of L beams from $N_1*N_2$ beams in a certain beam group (for example, the beam group is indicated by $i_{1,4,1}$ may be regarded as an indication for wideband amplitude coefficient of each beam in L beams; $i_{2,1,1}$ may be regarded an indication of phase coefficient for the beams, whose wideband amplitude parameter value are not zero; $i_{2,2,1}$ may be regarded an indication of subband amplitude coefficient for the beams, whose wideband amplitude parameter value are not zero.

It would be understood that the overhead for the PMI feedback is large. In addition if the system bandwidth is wide, the feedback for each of a plurality of subbands in the system bandwidth is to be transmitted, which will further increase the overhead as the number of the subbands increases.

Currently, the Codebook subset restriction (CBSR) was introduced for type II codebook to reduce the calculation complexity for the channel state. However, the feedback overhead is not changed.

According to embodiments of the present disclosure, there is provided a solution for reducing CSI feedback overhead. In this solution, the PMI only associated with some certain beams will be reported to the network device to reduce the overhead of CSI feedback. More details of the embodiments of the present disclosure will be discussed with reference to FIGS. 2 to 8.

Figure 2:
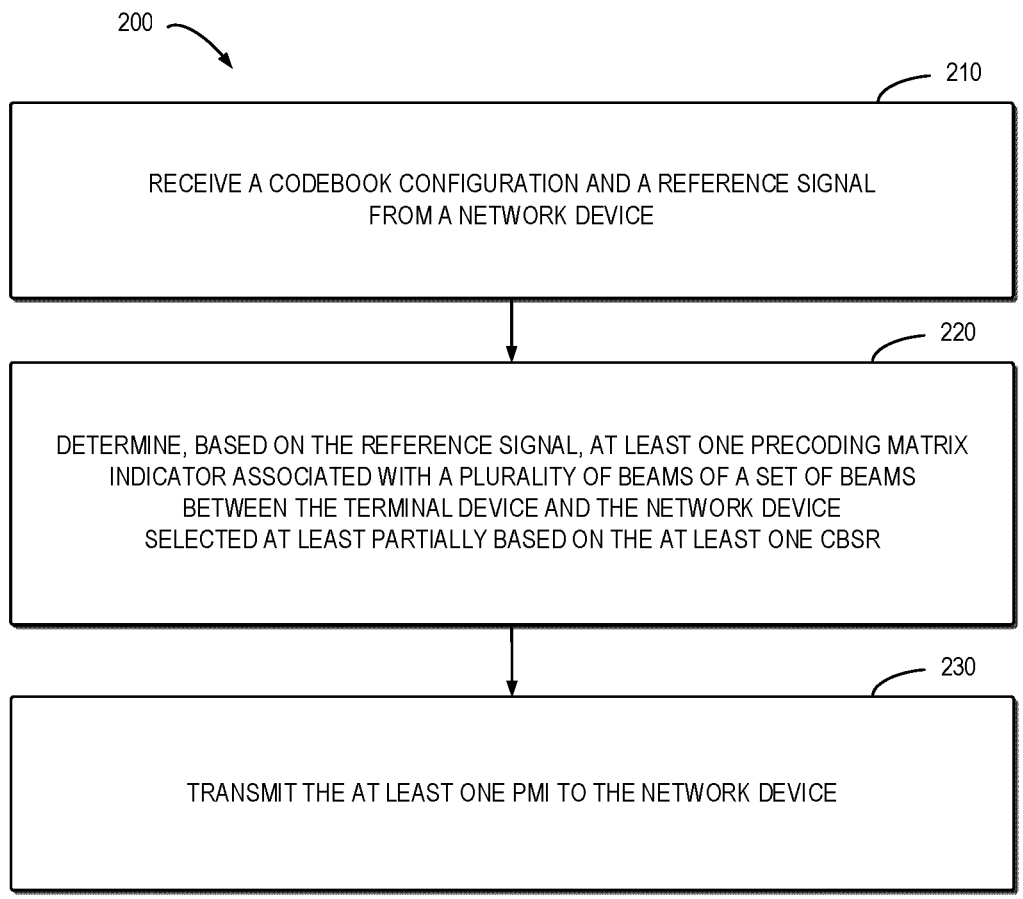
FIG. 2 shows a flowchart of an example method 200 for reducing CSI feedback overhead according to some embodiments of the present disclosure.

FIG. 2 shows a flowchart of an example method 200 for reducing channel state information (CSI) feedback overhead in accordance with some embodiments of the present disclosure. The method 200 can be implemented at the terminal device 120 as shown in FIG. 1. It is to be understood that the method 200 may include additional blocks not shown and/or may omit some blocks as shown, and the scope of the present disclosure is not limited in this regard. For the purpose of discussion, the method 200 will be described from the perspective of the terminal device 120 with reference to FIG. 1.

At block 210, terminal device 120 receives a codebook configuration and a reference signal from a network device 110, the codebook configuration indicates at least one codebook subset restriction (CBSR).

In some embodiments, the terminal device 120 receives a radio resource control (RRC) signaling from the network device 110 and determines number of antenna ports in first and second dimensions of an antenna array of the network device 110 and oversampling factors corresponding to the number of antenna ports in the first and second dimensions of an antenna array of the network device 110 based on the RRC signaling. The terminal device 120 receives a reference signal at least based on the number of antenna ports in first and second dimensions of the antenna array at the network device 110 and the corresponding oversampling factors. Further, the terminal device 120 obtains the channel state information based on the reference signal.

As mentioned above, the number of antenna ports in first and second dimension of an antenna array of the network device may be referred to the type II codebook as shown in Equation (3), namely $N_1$ and $N_2$. Specifically, $N_1$ and $N_2$ could be understood as the number of antenna ports corresponding to the first and second dimension (for example, horizontal and vertical direction) of the network device 120. Furthermore, in some cases, the oversampling factors corresponding to the number of the first and second dimension of an antenna array of the network device 120 may be referred to $O_1$ and $O_2$, as mentioned above, which configured numbers for oversampling the spatial directions.

In general, the value of the oversampling factors $O_1$, $O_2$ are corresponding to the numbers of the number of the first and second dimensions of an antenna array $N_1$, $N_2$, The following Table 2 shows the supported configuration of ($N_1$, $N_2$) and ($O_1$, $O_2$).

TABLE 2

| supported configuration of ($N_1$, $N_2$) and ($O_1$, $O_2$) | | |
|---|---|---|
| Number of CSI-RS antenna ports, $P_{CSI-RS}$ | ($N_1$, $N_2$) | ($O_1$, $O_2$) |
| 4 | (2, 1) | (4, 1) |
| 8 | (2, 2) | (4, 4) |
|   | (4, 1) | (4, 1) |
| 12 | (3, 2) | (4, 4) |
|   | (6, 1) | (4, 1) |
| 16 | (4, 2) | (4, 4) |
|   | (8, 1) | (4, 1) |
| 24 | (4, 3) | (4, 4) |
|   | (6, 2) | (4, 4) |
|   | (12, 1) | (4, 1) |
| 32 | (4, 4) | (4, 4) |
|   | (8, 2) | (4, 4) |
|   | (16, 1) | (4, 1) |

In some embodiments, the network device 110 may configure the numbers of the dimension of an antenna array $N_1$, $N_2$ and inform the configuration of the numbers of the dimension of an antenna array $N_1$, $N_2$ to the terminal device 110 via RRC signaling. Accordingly, a number of the oversampling factors $O_1$, $O_2$ may be obtained by the terminal device 110 as well.

At block 220, the terminal device 120 determines at least one precoding matrix indicator (PMI) based on the reference signal. The at least one PMI is associated with a plurality of beams of a set of beams between the terminal device and the network device selected at least partially based on the at least one CBSR.

In some cases, the terminal device 120 may determine the total number ($N_1*N_2*O_1*O_2$) of beams and the total number ($O_1*O_2$) of beam groups between the terminal device 120 and the network device 110 in a different spatially directions based on the numbers of the first and second dimensions of an antenna array $N_1$, $N_2$ and the corresponding oversampling factors $O_1$, $O_2$. For example, if $N_1$=4 and $N_2$=4, the corresponding oversampling factors $O_1$=4 and $O_2$=4. Thus, in a 2-dimension antenna array defined by $N_1$, $N_2$ and $O_1$, $O_2$, the total number of beam groups is $O_1*O_2$=16 and the total number of beams is $N_1*N_2*O_1*O_2$=256. There are $N_1*N_2$ beams in each beam group, namely 16.

It would be understood that if the terminal device 120 reports the PMI associated with each beam group or each beams in the 2-dimension antenna array to the network device 120, the overhead for the CSI feedback is very large. Thus, it would be considered to restrict the number of beams to be reported.

In some embodiments, the terminal device 120 may obtain a first CBSR of the at least one CBSR from RRC signaling received from the network device 110. The first CBSR indicating a third number of a first beam groups selected from a set of beams between the terminal device and the network device and a fourth number of beams selected from the set of beams.

As mentioned above, the codebook subset restriction (CBSR) was introduced for type II codebook to reduce the calculation complexity for the channel state. In other words, some specified beams may be selected from all beams. In order to reduce the overhead of the CSI feedback, the mechanism of CBSR may be introduce to determine the PMI.

In some embodiments, the first CBSR may indicate a third number of beams groups (for example, denoted as P) with totally a fourth number of beams (for example, denoted as H) from the set of total number ($N_1*N_2*O_1*O_2$) of beams to be selected.

In some embodiments, the terminal device 120 may determine one or more PMIs based on the first CBSR and a number of antenna ports in a first and second dimensions of an antenna array of the network device and oversampling factors corresponding to the number of antenna ports in the first and second dimensions of the antenna array of the network device. For example, the terminal device 120 may determine at least one of the first PMI and the second PMI.

In some embodiments, the first PMI (referred to as $i_{1,1}$ shown in table 1) and/or the second PMI (referred to as $i_{1,2}$ shown in table 1). In some embodiments, the first PMI indicates a group (for example, denoted as G) of second number of beams (for example, denoted as F) selected from the fourth number of beams H. In some embodiments, the second PMI indicates a first number of beams (for example, denoted as L, for example, L is integer and L may be 2 or 3 or 4 or 5 or 6) selected from the group of second number of beams G.

The process of determining the first and the second PMIs is described in detail below with reference to FIG. 3A-3C and FIG. 4, respectively.

In some embodiments, a plurality of beams between the terminal device 120 and the network device 110 in a different spatially directions may be represented in a 2-dimension antenna array defined by $N_1$, $N_2$ and $O_1$, $O_2$. The first CBSR may indicate a third number of beams groups (for example, denoted as P) with totally a fourth number of beams (for example, denoted as H) selected from total set of ($N_1*N_2*O_1*O_2$) beams. For different values of $N_1$ and $N_2$, if CBSR is configured, according to the first CBSR, the total number of beams available M for the second PMI is different.

In some embodiments, the number of bits for the second PMI feedback is based on the number of available beams (for example, denoted as M). And the M available beams are based on the fourth number of beams H indicated by CBSR. In some embodiments, for different values of $N_1$ and/or $N_2$ and/or different configurations of CBSR, the values of M are different.

In some embodiments, in configuration of codebook subset restriction, the total number of beam groups is $O_1*O_2$ and the total number of beams is $N_1*N_2*O_1*O_2$. There are $N_1*N_2$ beams in each beam group. The index of beam group in the antenna array may be represented as $\{r_1(i), r_2(i)\}$, wherein $r_1(i)=0, 1, \ldots, O_1-1, r_2(i)=0, 1, \ldots, O_2-1, i=0, 1, \ldots, P-1$. In each group, the beams are $(r_1(i)*N_1+x_1, r_2(i)*N_2+x_2)$, $x_1=0, 1, \ldots, N_1-1, x_2=0, 1, \ldots, N_2-1$. In some embodiments, the third number of beams groups (P, for example, P is integer and P may be 1 or 2 or 3 or 4 or 5 or 6) is selected from total $O_1*O_2$ beam groups. In some embodiments, P may be 4, and $O_1*O_2$ may be 4. In this case, there may be no need of selection of third number of beams groups P from total $O_1*O_2$ beam groups. Alternatively, the third number of beams groups P are the total $O_1*O_2$ beam groups.

Figure 3A:
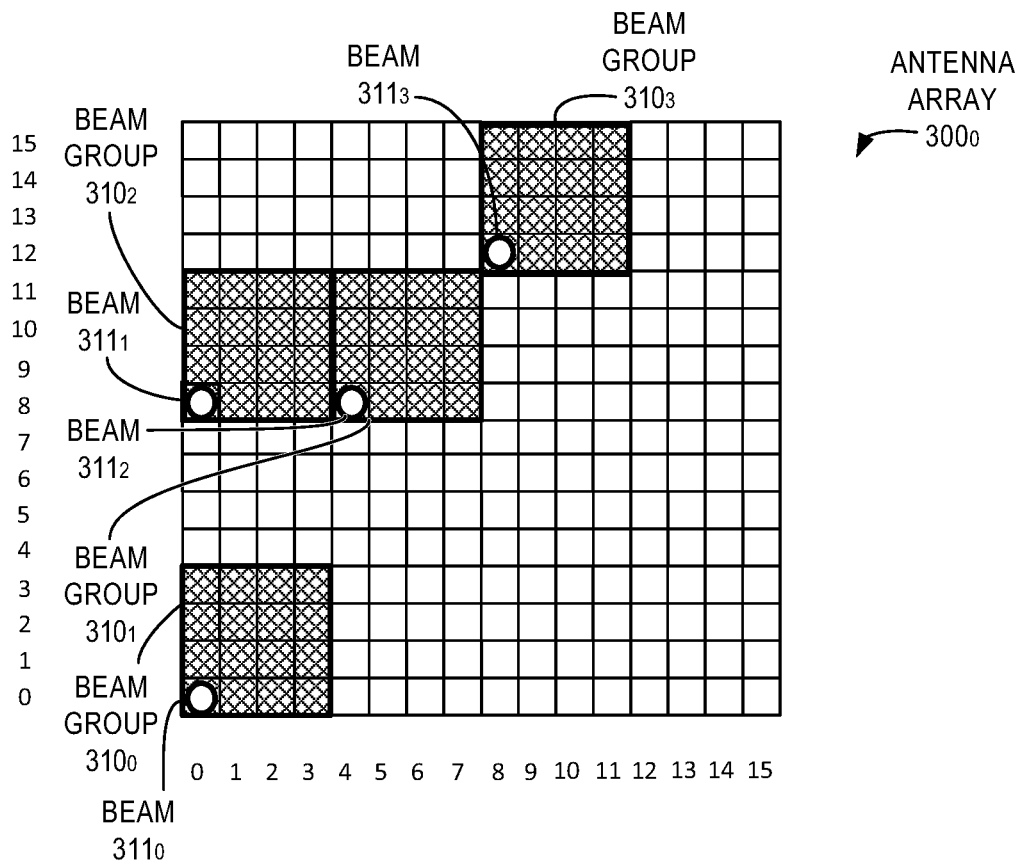
FIGS. 3A-3C show examples of some embodiments of the present disclosure.

As an example, an antenna array 300₀ defined by $N_1=4$ and $N_2=4$, $O_1=4$ and $O_2=4$ may be illustrated in FIG. 3A. In antenna array 300₀, the total number of beam groups is $O_1*O_2=16$ and the total number of beams is $N_1*N_2*O_1*O_2=256$. There are 16 beams in each beam group. The index of beam group in the antenna array may be represented as $\{r_1(i), r_2(i)\}$, wherein $r_1=0, 1, \ldots, O_1-1,$ $r_2=0, 1, \ldots, O_2-1, i=0, 1, \ldots, P-1$. In each group, the beams are $(r_1(i)*r_2(i)*N_2+x_2)$, $x_1=0, 1, \ldots, x_2=0, 1, \ldots, N_2-1$.

In table 1, $i_{1,2}$ may be referred to $$\left\lceil \log_2 \binom{N_1 N_2}{L} \right\rceil,$$

which means L beams may be selected from $N_1*N_2$ available beams. Thus, in some embodiment, reducing the number of available beams is expected. In some embodiments, $$\binom{x}{y} = x!/(y! *(x-y)!) \text{ if } x \geq y \text{ and } \binom{x}{y} = 0 \text{ if } x < y.$$

In some embodiments, P (for example. P may be 2 or 3 or 4 or 5 or 6) beam groups may be selected. The indices of the selected beam groups $\{r_1(i), r_2(i)\}$ may be represent as any P combinations from $\{r_1(i), r_2(i)\}$, wherein $r_1(i)=0, 1, \ldots, O_1-1, r_2(i)=0, 1, \ldots, O_2-1, i=0, 1, \ldots, P-1$. In some embodiments, no matter which P groups are selected, the $N_1*N_2$ beams within one group are not orthogonal. For example, for $i_{1,2}$, the first number of beams (L orthogonal beams) should be selected from P groups with same $x_1$, $x_2$ value and the number of bits for $i_{1,2}$ may be denoted as $$\left\lceil \log_2 \binom{P}{L} \right\rceil.$$

For example, in this case, $N_1=4$ and $N_2=4$, or $N_1=4$ and $N_2=3$, or $N_1=4$ and $N_2=2$, or $N_1=4$ and $N_2=1$, or $N_1=2$ and $N_2=1$, or $N_1=2$ and $N_2=2$, or $N_1=3$ and $N_2=2$.

According to the first CBSR, 4 beam groups could be selected in the antenna array 300₀ as shown in FIG. 3A, which are groups 310₀-310₃. The indices of the selected beam groups $\{r_1(i), r_2(i)\}$ may be represent as $\{0,0\}$, $\{0,2\}$, $\{1,2\}$, $\{2,3\}$, respectively. In this case, no matter which 4 groups are selected, the $N_1*N_2$ beams within one group are not orthogonal. For $i_{1,2}$, L orthogonal beams from 4 groups with same $x_1$, $x_2$ value should be selected and number of bits for $i_{1,2}$ may be rewrote as $$\left\lceil \log_2 \binom{M}{L} \right\rceil,$$

namely $$\left\lceil \log_2 \binom{4}{L} \right\rceil$$

for this case. Thus, in this case, maximal four available beams may be selected from the antenna array 300₀, namely beams 311₀-311₃. Comparing with the value of $N_1*N_2$, the number of the selected available is reduced. Accordingly, The bit field for $i_{1,2}$ feedback when CBSR is configured can be reduced. For example, when L=2, the field is 3 bits; when L=3, 2 bits is enough and when L=4, the field is 0 bit, in other words, there is no need to feedback $i_{1,2}$. It should be understood that the indices of the selected beam groups $\{r_1(i), r_2(i)\}$ is only for the purpose of illustration without suggesting any limitations. The indices of the selected beam groups $\{r_1(i), r_2(i)\}$ may be any P combinations from the set of ($\{0,0\}$, $\{0,1\}$, $\{0,2\}$, $\{0,3\}$, $\{1,0\}$, $\{1,1\}$, $\{1,2\}$, $\{1,3\}$, $\{2,0\}$, $\{2,1\}$, $\{2,2\}$, $\{2,3\}$, $\{3,0\}$, $\{3,1\}$, $\{3,2\}$, $\{3,3\}$) for implementing implementations of the present disclosure.

In some embodiments, P (for example. P may be 2 or 3 or 4 or 5 or 6) beam groups may be selected. The indices of the selected beam groups $\{r_1(i), r_2(i)\}$ may be represent as any P combinations from $\{r_1(i), r_2(i)\}$, wherein $r_1(i)=0, 1, \ldots, O_1-1, r_2(i)=0, 1, \ldots, O_2-1, i=0, 1, \ldots, P-1$. In some embodiments, no matter which P groups are selected, the number of bits for $i_{1,2}$ may be no more than $$\left\lceil \log_2 \binom{2*P}{L} \right\rceil.$$

For example, in this case, $N_1=8$ and $N_2=1$, or $N_1=8$ and $N_2=2$ or $N_1=6$ and $N_2=2$ or $N_1=6$ and $N_2=1$.

In some embodiments, P (for example. P may be 2 or 3 or 4 or 5 or 6) beam groups may be selected. The indices of the selected beam groups $\{r_1(i), r_2(i)\}$ may be represent as any P combinations from $\{r_1(i), r_2(i)\}$, wherein $r_1(i)=0, 1, \ldots, O_1-1, r_2(i)=0, 1, \ldots, O_2-1, i=0, 1, \ldots, P-1$. In some embodiments, no matter which P groups are selected, the number of bits for $i_{1,2}$ may be no more than $$\left\lceil \log_2 \binom{3*P}{L} \right\rceil.$$

For example, in this case, $N_1=12$ and $N_2=1$.

In some embodiments, P (for example. P may be 2 or 3 or 4 or 5 or 6) beam groups may be selected. The indices of the selected beam groups $\{r_1(i), r_2(i)\}$ may be represent as any P combinations from $\{r_1(i), r_2(i)\}$, wherein $r_1(i)=0, 1, \ldots, O_1-1, r_2(i)=0, 1, \ldots, O_2-1, i=0, 1, \ldots, P-1$. In some embodiments, no matter which P groups are selected, the number of bits for $i_{1,2}$ may be no more than $$\left\lceil \log_2 \binom{4*P}{L} \right\rceil.$$

For example, in this case, $N_1=16$ and $N_2=1$.

In some embodiments, if $N_1=4$, $N_2=2$, the total number of beams available for $i_{1,2}$ depends on the selected groups in the first CBSR. According to table 2, if $N_1=4$, $N_2=2$, then $O_1=4$ and $O_2=4$.

In this case, the total number of beam groups is $O_1*O_2=16$ and the total number of beams is $N_1*N_2*O_1*O_2=128$. There are 8 beams in each beam group. Within all the $N_1*N_2*O_1*O_2=128$ beams, for each group, $N_1*N_2=8$ orthogonal beams are included. For this case, the indices of the beam groups selected based on the first CBSR may result to different available number of orthogonal beams for $i_{1,2}$.

Figure 3B:
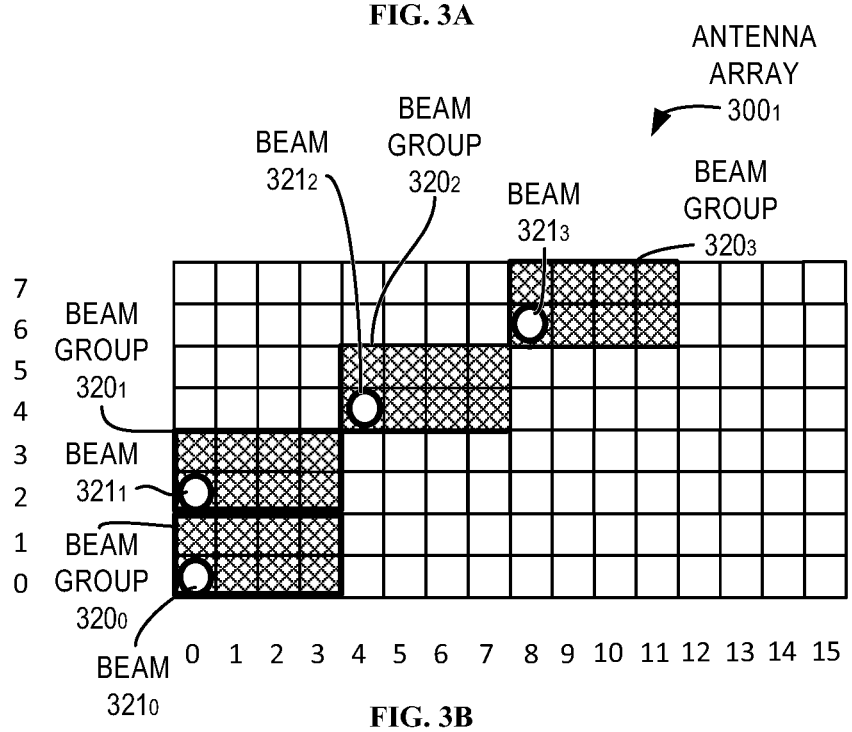

As another example, an antenna array $300_1$ defined by $N_1=4$ and $N_2=2$, $O_1=4$ and $O_2=4$ may be illustrated in FIG. 3B. In antenna array $300_1$, the total number of beam groups is $O_1*O_2=16$ and the total number of beams is $N_1*N_2*O_1*O_2=128$. There are 8 beams in each beam group for CBSR. Similar with the antenna array $300_0$ as shown in FIG. 3A, the index of a beam group in the may be represented as $\{r_1(i), r_2(i)\}$, wherein $r_1=0, 1, \ldots, O_1-1, r_2=0, 1, \ldots, O_2-1, i=0, 1, \ldots, P-1$. In each group, the beams are $(r_1(i)*N_1+x_1, r_2(i)*N_2+x_2)$, $x_1=0, 1, \ldots, N_1-1, x_2=0, 1, \ldots, N_2-1$.

According to the first CBSR, 4 beam groups could be selected in the antenna array $300_1$ as shown in FIG. 3B, which are groups $320_0$-$320_3$. The indices of the selected beam groups $\{r_1(i), r_2(i)\}$ may be represent as $\{0,0\}$, $\{0,2\}$, $\{1,2\}$, $\{2,3\}$, respectively. It should be understood that the indices of the selected beam groups $\{r_1(i), r_2(i)\}$ is only for the purpose of illustration without suggesting any limitations. The indices of the selected beam groups $\{r_1(i), r_2(i)\}$ may be any P combinations from the set of ($\{0,0\}$, $0,11$, $\{0,2\}$, $\{0,3\}$, $\{1,0\}$, $\{1,1\}$, $\{1,2\}$, $\{1,3\}$, $\{2,0\}$, $\{2,1\}$, $\{2,2\}$, $\{2,3\}$, $\{3,0\}$, $\{3,1\}$, $\{3,2\}$, $\{3,3\}$) for implementing implementations of the present disclosure. The beams in corresponding position within 4 groups may represent as (a1,b1), (a2,b2), (a3,b3), (a4,b4). Once an index associated with a corresponding position of a beam may meet the Equations (4) or (5) as below, then the beams are orthogonal to each other:

$$|a\_i - a\_j| = A*O_1 (A \geq 1) \quad (4)$$

$$|b\_i - b\_j| = B*O_2 (B \geq 1) \quad (5)$$

Thus, in the four beams $321_0$-$321_3$ shown in FIG. 3B, beam $321_0$ and beam $321_1$ are not orthogonal. Thus, for the beams $321_0$-$321_3$ of the beam groups $320_0$-$320_3$, if the beam $321_0$ of the beam group $320_0$ is selected, then the beam $321_2$ of the beam group $320_2$ is selected. Similarly, if the beam $321_1$ of the beam group $320_1$ is selected, then the beam $321_3$ of the beam group $320_3$ is selected. Thus, in the case shown in FIG. 3B, the number of available beams for $i_{1,2}$ is M=2 and therefore $$\left\lceil \log_2 \binom{N_1 N_2}{L} \right\rceil$$

for $i_{1,2}$ may be rewrote as $$\left\lceil \log_2 \binom{M}{L} \right\rceil,$$

namely $$\left\lceil \log_2 \binom{2}{L} \right\rceil.$$

Figure 3C:
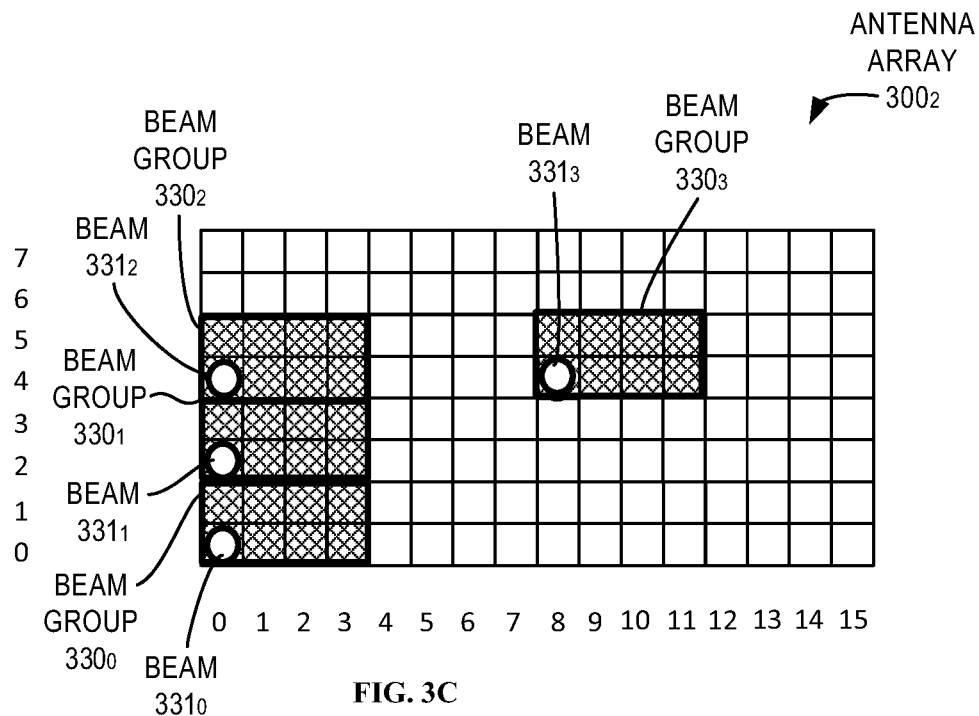

A further example for an antenna array also defined by $N_1=4$ and $N_2=2$, $O_1=4$ and $O_2=4$ may be illustrated in FIG. 3C. In antenna array $300_2$, the total number of beam groups is $O_1*O_2=16$ and the total number of beams is $N_1*N_2*O_1*O_2=128$. There are 8 beams in each beam group. Similar with the antenna array $300_0$ as shown in FIGS. 3A and 3B, the index of a beam group in the may be represented as $\{r_1(i), r_2(i)\}$, wherein $r_1=0, 1, \ldots, O_1-1, r_2=0, 1, \ldots, O_2-1, i=0, 1, \ldots, P-1$. In each group, the beams are $(r_1(i)*r_2(i)*N_2+x_2)$, $x_1=0, 1, \ldots, N_1-1, x_2=0, 1, \ldots, N_2-1$.

According to the first CBSR, 4 beam groups could be selected in the antenna array $300_2$ as shown in FIG. 3B, which are groups $330_0$-$330_3$. The indices of the selected beam groups $\{r_1(i), r_2(i)\}$ may be represent as $\{0,0\}$, 0,11, $\{0,3\}$, $\{3,3\}$, respectively. It should be understood that the indices of the selected beam groups $\{r_1(i), r_2(i)\}$ is only for the purpose of illustration without suggesting any limitations. The indices of the selected beam groups $\{r_1(i), r_2(i)\}$ may be any P combinations from the set of ($\{0,0\}$, 0,11, $\{0,2\}$, $\{0,3\}$, $\{1,0\}$, $\{1,1\}$, $\{1,2\}$, 0,31, $\{2,0\}$, $\{2,1\}$, $\{2,2\}$, $\{2,3\}$, $\{3,0\}$, $\{3,1\}$, $\{3,2\}$, $\{3,3\}$) for implementing implementations of the present disclosure. The beams in corresponding position within 4 groups may represent as (a1,b1), (a2,b2), (a3,b3), (a4,b4). As described above, if an index associated with a corresponding position of a beam may meet the Equations (4) or (5), then the beams are orthogonal to each other.

Thus, in the four beams $331_0$-$331_3$ shown in FIG. 3C, beam $331_0$, beam $331_2$ and beam $321_3$ are orthogonal. Thus, for the beams $331_0$-$331_3$ of the beam groups $330_0$-$330_3$, if the beam $331_0$ of the beam group $330_0$ is selected, then the beam $331_2$ of the beam group $330_2$ and the beam $321_3$ of the beam group $330_2$ are selected. If the beam $331_1$ of the beam group $3301$ is selected, there is no beam orthogonal to beam $331_1$ in the other three beam groups.

As a result, in the case shown in FIG. 3C, the number of available beams for $i_{1,2}$ is M=3 and therefore $$\left\lceil \log_2 \binom{N_1 N_2}{L} \right\rceil$$

for $i_{1,2}$ may be rewrote as $$\left\lceil \log_2 \binom{M}{L} \right\rceil,$$

namely $$\left\lceil \log_2 \binom{3}{L} \right\rceil.$$

In some embodiments, if $N_1$=4, $N_2$=2, the total number of beam groups is $O_1$*$O_2$=16 and the total number of beams is $N_1$*$N_2$*$O_1$*$O_2$=128. There are 8 beams in each beam group for CBSR. The index of a beam group in the may be represented as $\{r_1(i), r_2(i)\}$, wherein $r_1$=0, 1, . . . , $O_1$-1, $r_2$=0, 1, . . . , $O_2$-1, i=0, 1, . . . , P-1. In each group, the beams are $(r_1(i)*N_1+x_1, r_2(i)*N_2+x_2)$, $x_1$=0, 1, . . . , $N_1$-1, $x_2$=0, 1, . . . , $N_2$-1. In some embodiments, when P=4, the indices of the 4 selected beam groups $\{r_1(i), r_2(i)\}$ may be represent as $\{r_1(0), r_2(0)\}$, $\{r_1(1), r_2(1)\}$, $\{r_1(2), r_2(2)\}$, $\{r_1(3), r_2(3)\}$, respectively. And the number of available beams for $i_{1,2}$ is M and the number of bits for $i_{1,2}$ may be no more than $$\left\lceil \log_2 \binom{M}{L} \right\rceil.$$

In some embodiments, if the values of $r_2(i)$ are all from (0, 2) or all from (1, 3), the number of available beams for $i_{1,2}$ is no more than 4, and the number of bits for $i_{1,2}$ may be no more than $$\left\lceil \log_2 \binom{4}{L} \right\rceil.$$

In some embodiments, for i=0, 1, 2, 3, if two values of $r_2(i)$ are from (0, 2), and two values of $r_2(i)$ are from (1, 3), the number of available beams for $i_{1,2}$ is no more than 2, and the number of bits for $i_{1,2}$ may be no more than $$\left\lceil \log_2 \binom{2}{L} \right\rceil.$$

For example, in this case, the terminal device does not assumed to be configured with L larger than 2. Alternatively, L can only be 2. In some embodiments, for i=0, 1, 2, 3, if three values of $r_2(i)$ are from (0, 2), and one value of $r_2(i)$ is from (1, 3), the number of available beams for $i_{1,2}$ is no more than 3, and the number of bits for $i_{1,2}$ may be no more than $$\left\lceil \log_2 \binom{3}{L} \right\rceil.$$

For example, in this case, the terminal device does not assumed to be configured with L larger than 3. Alternatively, L can only be 2 or 3. In some embodiments, for i=0, 1, 2, 3, if one value of $r_2(i)$ is from (0, 2), and three values of $r_2(i)$ are from (1, 3), the number of available beams for $i_{1,2}$ is no more than 3, and the number of bits for $i_{1,2}$ may be no more than $$\left\lceil \log_2 \binom{3}{L} \right\rceil.$$

For example, in this case, the terminal device does not assumed to be configured with L larger than 3. Alternatively, L can only be 2 or 3.

In some embodiments, if $N_1$=3, $N_2$=2, the total number of beam groups is $O_1$=$O_2$=16 and the total number of beams is $N_1$*$N_2$*$O_1$*$O_2$=96. There are 6 beams in each beam group for CBSR. The index of a beam group in the may be represented as $\{r_1(i), r_2(i)\}$, wherein $r_1$=0, 1, . . . , $O_1$-1, $r_2$=0, 1, . . . , $O_2$-1, i=0, 1, . . . , P-1. In each group, the beams are $(r_1(i)*r_2(i)*N_2+x_2)$, $x_1$=0, 1, . . . , $N_1$-1, $x_2$=0, 1, . . . , $N_2$-1. In some embodiments, when P=4, the indices of the 4 selected beam groups $\{r_1(i), r_2(i)\}$ may be represent as $\{r_1(0), r_2(0)\}$, $\{r_1(1), r_2(1)\}$, $\{r_1(2), r_2(2)\}$, $\{r_1(3), r_2(3)\}$, respectively, and the number of available beams for $i_{1,2}$ is M and the number of bits for $i_{1,2}$ may be no more than $$\left\lceil \log_2 \binom{M}{L} \right\rceil.$$

In some embodiments, if the values of $r_2(i)$ are all from (0, 2) or all from (1, 3), the number of available beams for $i_{1,2}$ is no more than 4, and the number of bits for $i_{1,2}$ may be no more than $$\left\lceil \log_2 \binom{4}{L} \right\rceil.$$

In some embodiments, for i=0, 1, 2, 3, if two values of $r_2(i)$ are from (0, 2), and two values of $r_2(i)$ are from (1, 3), the number of available beams for $i_{1,2}$ is no more than 2, and the number of bits for $i_{1,2}$ may be no more than $$\left\lceil \log_2 \binom{2}{L} \right\rceil.$$

For example, in this case, the terminal device does not assumed to be configured with L larger than 2. Alternatively, L can only be 2. In some embodiments, for i=0, 1, 2, 3, if three values of $r_2(i)$ are from (0, 2), and one value of $r_2(i)$ is from (1, 3), the number of available beams for $i_{1,2}$ is no more than 3, and the number of bits for $i_{1,2}$ may be no more than $$\left\lceil \log_2 \binom{3}{L} \right\rceil.$$

For example, in this case, the terminal device does not assumed to be configured with L larger than 3. Alternatively, L can only be 2 or 3. In some embodiments, for i=0, 1, 2, 3, if one value of $r_2(i)$ is from (0, 2) and three values of $r_2(i)$ are from (1, 3), the number of available beams for $i_{1,2}$ is no more than 3 and the number of bits for $i_{1,2}$ may be no more than $$\left\lceil \log_2 \binom{3}{L} \right\rceil.$$

For example, in this case, the terminal device does not assumed to be configured with L larger than 3. Alternatively, L can only be 2 or 3.

In some embodiments, if $N_1$=6, $N_2$=2, the total number of beam groups is $O_1 * O_2$=16 and the total number of beams is $N_1 * N_2 * O_1 * O_2$=192. There are 12 beams in each beam group for CBSR. The index of a beam group in the may be represented as $\{r_1(i), r_2(i)\}$, wherein $r_1$=0, 1, . . . , $O_1$−1, $r_2$=0, 1, . . . , $O_2$−1, i=0, 1, . . . , P−1. In each group, the beams are $(r_1(i) * r_2(i) * N_2 + x_2)$, $x_1$=0, 1, . . . , $N_1$−1, $x_2$=0, 1, . . . , $N_2$−1. In some embodiments, when P=4, the indices of the 4 selected beam groups $\{r_1(i), r_2(i)\}$ may be represent as $\{r_1(0), r_2(0)\}$, $\{r_1(1), r_2(1)\}$, $\{r_1(2), r_2(2)\}$, $\{r_1(3), r_2(3)\}$, respectively, and the number of available beams for $i_{1,2}$ is M and the number of bits for $i_{1,2}$ may be no more than $$\left\lceil \log_2 \binom{M}{L} \right\rceil.$$

In some embodiments, if the values of $r_2(i)$ are all from (0, 2) or all from (1, 3), the number of available beams for $i_{1,2}$ is no more than 8, and the number of bits for $i_{1,2}$ may be no more than $$\left\lceil \log_2 \binom{8}{L} \right\rceil.$$

In some embodiments, for i=0, 1, 2, 3, if two values of $r_2(i)$ are from (0, 2), and two values of $r_2(i)$ are from (1, 3), the number of available beams for $i_{1,2}$ is no more than 4, and the number of bits for $i_{1,2}$ may be no more than $$\left\lceil \log_2 \binom{4}{L} \right\rceil.$$

In some embodiments, for i=0, 1, 2, 3, if three values of $r_2(i)$ are from (0, 2), and one value of $r_2(i)$ is from (1, 3), the number of available beams for $i_{1,2}$ is no more than 6, and the number of bits for $i_{1,2}$ may be no more than $$\left\lceil \log_2 \binom{6}{L} \right\rceil.$$

In some embodiments, for i=0, 1, 2, 3, if one value of $r_2(i)$ is from (0, 2), and three values of $r_2(i)$ are from (1, 3), the number of available beams for $i_{1,2}$ is no more than 6, and the number of bits for $i_{1,2}$ may be no more than $$\left\lceil \log_2 \binom{6}{L} \right\rceil.$$

In some embodiments, if $N_1$=8, $N_2$=2, the total number of beam groups is $O_1 * O_2$=16 and the total number of beams is $N_1 * N_2 * O_1 * O_2$=256. There are 16 beams in each beam group for CBSR. The index of a beam group in the may be represented as $\{r_1(i), r_2(i)\}$, wherein $r_1$=0, 1, . . . , $O_1$−1, $r_2$=0, 1, . . . , $O_2$−1, i=0, 1, . . . , P−1. In each group, the beams are $(r_1(i) * N_1 + x_1, r_2(i) * N_2 + x_2)$, $x_1$=0, 1, . . . , $N_1$−1, $x_2$=0, 1, . . . , $N_2$−1. In some embodiments, when P=4, the indices of the 4 selected beam groups $\{r_1(i), r_2(i)\}$ may be represent as $\{r_1(0), r_2(0)\}$, $\{r_1(1), r_2(1)\}$, $\{r_1(2), r_2(2)\}$, $\{r_1(3), r_2(3)\}$, respectively, and the number of available beams for $i_{1,2}$ is M and the number of bits for $i_{1,2}$ may be no more than $$\left\lceil \log_2 \binom{M}{L} \right\rceil.$$

In some embodiments, if the values of $r_2(i)$ are all from (0, 2) or all from (1, 3), the number of available beams for $i_{1,2}$ is no more than 16, and the number of bits for $i_{1,2}$ may be no more than $$\left\lceil \log_2 \binom{16}{L} \right\rceil.$$

In some embodiments, for i=0, 1, 2, 3, if two values of $r_2(i)$ are from (0, 2), and two values of $r_2(i)$ are from (1, 3), the number of available beams for $i_{1,2}$ is no more than 8, and the number of bits for $i_{1,2}$ may be no more than $$\left\lceil \log_2 \binom{8}{L} \right\rceil.$$

In some embodiments, for i=0, 1, 2, 3, if three values of $r_2(i)$ are from (0, 2), and one value of $r_2(i)$ is from (1, 3), the number of available beams for $i_{1,2}$ is no more than 12, and the number of bits for $i_{1,2}$ may be no more than $$\left\lceil \log_2 \binom{12}{L} \right\rceil.$$

In some embodiments, for i=0, 1, 2, 3, if one value of $r_2(i)$ is from (0, 2), and three values of $r_2(i)$ are from (1, 3), the number of available beams for $i_{1,2}$ is no more than 12, and the number of bits for $i_{1,2}$ may be no more than $$\left\lceil \log_2 \binom{12}{L} \right\rceil.$$

In some embodiments, if $N_1=2$, $N_2=2$, the total number of beam groups is $O_1*O_2=16$ and the total number of beams is $N_1*N_2*O_1*O_2=64$. There are 4 beams in each beam group for CBSR. The index of a beam group in the may be represented as $\{r_1(i), r_2(i)\}$, wherein $r_1=0, 1, \ldots, O_1-1$, $r_2=0, 1, \ldots, O_2-1$, i=0, 1, \ldots, P-1. In each group, the beams are $(r_1(i)*N_1+x_1, r_2(i)*N_2+x_2)$, $x_1=0, 1, \ldots, N_1-1$, $x_2=0, 1, \ldots, N_2-1$. In some embodiments, when P=4, the indices of the 4 selected beam groups $\{r_1(i), r_2(i)\}$ may be represent as $\{r_1(0), r_2(0)\}$, $\{r_1(1), r_2(1)\}$, $\{r_1(2), r_2(2)\}$, $\{r_1(3), r_2(3)\}$, respectively, and the number of available beams for $i_{1,2}$ is M and the number of bits for $i_{1,2}$ may be no more than $$\left\lceil \log_2 \binom{M}{L} \right\rceil.$$

In some embodiments, if the values of $r_2(i)$ are all from (0, 2) or all from (1, 3), and values of $r_1(i)$ are all from (0, 2) or all from (1, 3), the number of available beams for $i_{1,2}$ is no more than 4, and the number of bits for $i_{1,2}$ may be no more than $$\left\lceil \log_2 \binom{4}{L} \right\rceil.$$

In some embodiments, if values of $r_2(i)$ are all from (0, 2) or all from (1,3), and three values of $r_1(i)$ are from (0, 2), and one value of $r_1(i)$ is from (1, 3), the number of available beams for $i_{1,2}$ is no more than 3, and the number of bits for $i_{1,2}$ may be no more than $$\left\lceil \log_2 \binom{3}{L} \right\rceil.$$

In some embodiments, if values of $r_2(i)$ are all from (0, 2) or all from (1,3), and one value of $r_1(i)$ is from (0, 2), and three values of $r_1(i)$ are from (1, 3), the number of available beams for $i_{1,2}$ is no more than 3, and the number of bits for $i_{1,2}$ may be no more than $$\left\lceil \log_2 \binom{3}{L} \right\rceil.$$

In some embodiments, if values of $r_1(i)$ are all from (0, 2) or all from (1,3), and three values of $r_2(i)$ are from (0, 2), and one value of $r_2(i)$ is from (1, 3), the number of available beams for $i_{1,2}$ is no more than 3, and the number of bits for $i_{1,2}$ may be no more than $$\left\lceil \log_2 \binom{3}{L} \right\rceil.$$

In some embodiments, if values of $r_1(i)$ are all from (0, 2) or all from (1,3), and one value of $r_2(i)$ is from (0, 2), and three values of $r_2(i)$ are from (1, 3), the number of available beams for $i_{1,2}$ is no more than 3, and the number of bits for $i_{1,2}$ may be no more than $$\left\lceil \log_2 \binom{3}{L} \right\rceil.$$

For example, in the case of number of available beams for $i_{1,2}$ is no more than 3, the terminal device does not assumed to be configured with L larger than 3. Alternatively, L can only be 2 or 3. In some embodiments, for i=0, 1, 2, 3, if two values of $r_2(i)$ are from (0, 2), and two values of $r_2(i)$ are from (1, 3), the number of available beams for $i_{1,2}$ is no more than 2, and the number of bits for $i_{1,2}$ may be no more than $$\left\lceil \log_2 \binom{2}{L} \right\rceil.$$

For example, in this case, the terminal device does not assumed to be configured with L larger than 2. Alternatively, L can only be 2. In some embodiments, for i=0, 1, 2, 3, if two values of $r_1(i)$ are from (0, 2), and two values of $r_1(i)$ are from (1, 3), the number of available beams for $i_{1,2}$ is no more than 2, and the number of bits for $i_{1,2}$ may be no more than $$\left\lceil \log_2 \binom{2}{L} \right\rceil.$$

For example, in this case, the terminal device does not assumed to be configured with L larger than 2. Alternatively, L can only be 2.

In some embodiment, for other configuration of $N_1$ and $N_2$ shown in Table 2, the maximal number of available beams for $i_{1,2}$ may also be determined.

In some embodiment, as an example, if $N_2=1$, $N_1=4$, the corresponding oversampling factor are $O_1=4$ and $O_2=1$. For this case, the total number of beam groups is $O_1*O_2=4$ and the total number of beams is $N_1*N_2*O_1*O_2=16$. There are 4 beams in each beam group. Since the antenna array of this case may be only divided in 4 groups, and L orthogonal beams from 4 groups with same $x_1$, $x_2$ value should be selected. In other words, the number of available beams for $i_{1,2}$ is M=4. It noted that M=$N_1$*$N_2$ in this case. Thus, for $N_2$=1, $N_1$=4, the overhead for $i_{1,2}$ is not reduced.

In some embodiment, as other example, if $N_2$=2, $N_1$=2, the corresponding oversampling factor are $O_1$=4 and $O_2$=4. Similar with the examples shown in FIGS. 3B and 3C, the total number of beams available for $i_{1,2}$ depends on the selected groups. If $r_2(i)$={0,2} or {1,3} and $r_1(i)$={0,2} or {1,3}, M=4; if $r_2(i)$={0,1} or {2,3} or {1,2} and $r_1(i)$={0,2} or {1,3}, M=2; if $r_1(i)$={0,1} or {2,3} or {1,2} and $r_2(i)$={0,2} or {1,3}, M=2 and if $r_1(i)$={0,1} or {2,3} or {1,2} and $r_2(i)$={0,1} or {2,3} or {1,2}, M=1. The maximal number of available beams for $i_{1,2}$ is M=4.

In some embodiment, as a further example, if $N_2$=3, $N_1$=4, the corresponding oversampling factor are $O_1$=4 and $O_2$=4. Similar with the examples shown in FIGS. 3B and 3C, the total number of beams available for $i_{1,2}$ depends on the selected groups. If $r_1(i)$ for i=0, 1, 2, 3 are same, M=3, otherwise M=4. The maximal number of available beams for $i_{1,2}$ is M=4.

In some embodiment, as another example, if $N_2$=6, $N_1$=2, the corresponding oversampling factor are $O_1$=4 and $O_2$=4. For this case, If $r_2(i)$ for i=0, 1, 2, 3 are same, M=6; if $r_1(i)$ for i=0, 1, 2, 3 are same, M=2; If $r_1(i)$ has three values and $r_2(i)$ has two values, M=7 and if $r_1(i)$ has two values and $r_2(i)$={0,2} or {1,3}, M=8. The maximal number of available beams for $i_{1,2}$ is M=8.

In some embodiment, as another example, if $N_2$=8, $N_1$=2, the corresponding oversampling factor are $O_1$=4 and $O_2$=4. For this case, If $r_2(i)$ for i=0, 1, 2, 3 are same, M=8; if $r_1(i)$ for i=0, 1, 2, 3 are same, M=2. The maximal number of available beams for $i_{1,2}$ is M=8.

For each case of the configuration of $N_1$ and $N_2$ shown in Table 2, it can be understood that it is unnecessary to determine the value of M for each situation of one $N_1$, $N_2$-configuration. On the contrary, if the maximal value M for one $N_1$, $N_2$-configuration is determined and the determined M is less than the value of $N_1$*$N_2$, the overhead feedback for $i_{1,2}$ could be reduced.

In some embodiment, for different values of $N_1$ and $N_2$, if CBSR is configured, according to the first CBSR, the number of available beam groups K for the first PMI are no larger than $O_1$*$O_2$. For example, the number of bits for $i_{1,1}$ is no more than $\lceil \log_2(O_1*O_2) \rceil$.

Figure 4:
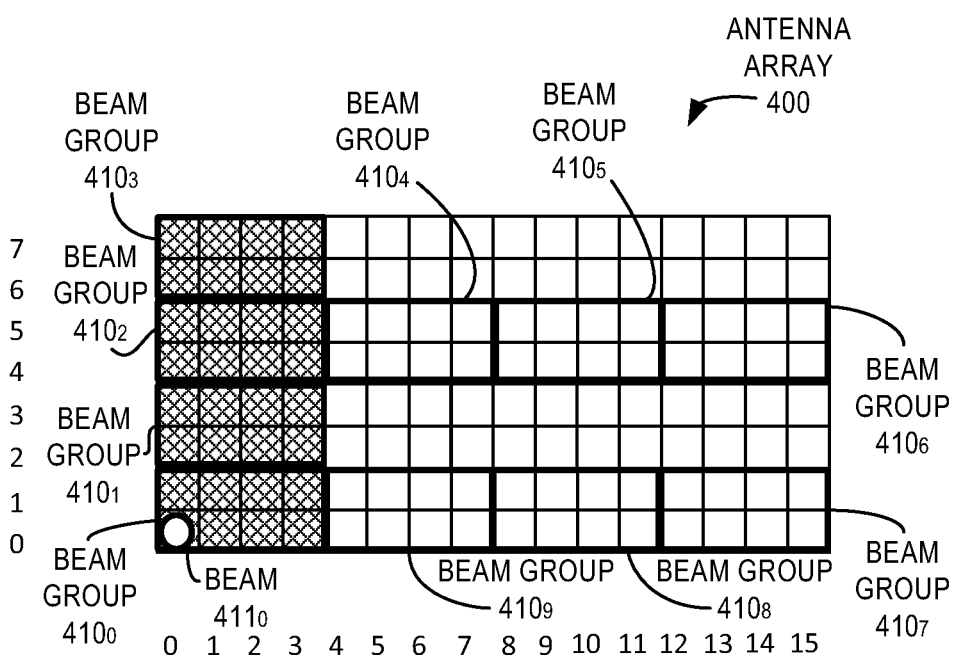
FIG. 4 shows an example of some embodiments of the present disclosure.

As an example, an antenna array $400_0$ defined by $N_1$=4 and $N_2$=2, $O_1$=4 and $O_2$=4 may be illustrated in FIG. 4. In antenna array $400_0$, the total number of beam groups is $O_1$*$O_2$=16 and the total number of beams is $N_1$*$N_2$*$O_1$*$O_2$=128. There are 8 beams in each beam group. The index of a beam group in the may be represented as {$r_1(i)$, $r_2(i)$}, wherein $r_1$=0, 1, ..., $O_1$-1, $r_2$=0, 1, ..., $O_2$-1, i=0, 1, ..., P-1. In each group, the beams are ($r_1(i)$*$N_1$+$x_1$, $r_2(i)$*$N_2$+$x_2$), $x_1$=0, 1, ..., $N_1$-1, $x_2$=0, 1, ..., $N_2$-1.

According to the first CBSR, 4 beam groups could be selected in the antenna array $400_0$ as shown in FIG. 4, which are groups $410_0$-$410_3$. The indices of the selected beam groups {$r_1(i)$, $r_2(i)$} may be represent as {0,0}, {0,1}, {0,2}, {0,3}, respectively. In other words, $r_2(i)$ for i=0, 1, 2, 3 are same. As described above, if an index associated with a corresponding position of a beam may meet the Equations (4) or (5), then the beams are orthogonal to each other. For example, in this case, if a beam, beam $411_0$, for example, will be selected from the beam group $410_0$, there are only other 7 beam groups of the 15 groups may include a beam orthogonal to beam $411_0$, namely beam groups $410_2$, $410_4$-$410_6$ and $410_7$-$410_9$. Thus, the number of available beam groups K for $i_{1,1}$ is 8, which is less than the value of $O_1$*$O_2$. Thus, the overhead feedback for $i_{1,1}$ is reduced.

Still referring the case of $N_1$=4 and $N_2$=2, $O_1$=4 and $O_2$=4, similarly, if $r_1(i)$ for i=0, 1, 2, 3 are same, K=8; if $r_1(i)$ has two values and $r_2(i)$={0,2} or {1,3}, K=8; otherwise K=16.

In some embodiment, as other example, if $N_2$=2, $N_1$=2, the corresponding oversampling factor are $O_1$=4 and $O_2$=4. For this case, if $r_2(i)$ for i=0, 1, 2, 3 are same, K=8; if $r_1(i)$ for i=0, 1, 2, 3 are same, K=8; if $r_2(i)$ has two values and if $r_1(i)$ has two values, K=8 except if $r_2(i)$={0,2} or {1,3} and $r_1(i)$={0,2} or {1,3}, K=4.

In some embodiment, as other example, if $N_2$=3, $N_1$=4, the corresponding oversampling factor are $O_1$=4 and $O_2$=4. For this case, if $r_2(i)$ for i=0, 1, 2, 3 are same, K=12; otherwise K=16.

In some embodiment, as other example, if $N_2$=2, $N_1$=3, the corresponding oversampling factor are $O_1$=4 and $O_2$=4. For this case, if $r_2(i)$ for i=0, 1, 2, 3 are same, K=8; if $r_1(i)$ for i=0, 1, 2, 3 are same, K=12; if $r_1(i)$ has two values and $r_2(i)$={0,2} or {1,3}, K=12; otherwise K=16.

In some embodiment, the terminal device 120 may also obtains the second CBSR from RRC signaling received from the network device 110, the second CBSR indicating a fifth number of a second beam groups selected from the set of beam and a sixth number of beams selected from the set of beams. In some embodiment, the second CBSR may refer to a restriction of amplitude value for one beam.

In some embodiments, if $N_1$=4, $N_2$=2, the total number of beam groups is $O_1$*$O_2$=16 and the total number of beams is $N_1$*$N_2$*$O_1$*$O_2$=128. There are 8 beams in each beam group for CBSR. The index of a beam group in the may be represented as {$r_1(i)$, $r_2(i)$}, wherein $r_1$=0, 1, ..., $O_1$-1, $r_2$=0, 1, ..., $O_2$-1, i=0, 1, ..., P-1. In each group, the beams are ($r_1(i)$*$N_1$+$x_1$, $r_2(i)$*$N_2$+$x_2$), $x_1$=0, 1, ..., $N_1$-1, $x_2$=0, 1, ..., $N_2$-1. In some embodiments, when P=4, the indices of the 4 selected beam groups {$r_1(i)$, $r_2(i)$} may be represent as {$r_1(0)$, $r_2(0)$}, {$r_1(1)$, $r_2(1)$}, {$r_1(2)$, $r_2(2)$}, {$r_1(3)$, $r_2(3)$}, respectively. And the number of available beams groups for $i_{1,1}$ is K and the number of bits for $i_{1,1}$ may be no more than $\lceil \log_2(K) \rceil$. In some embodiments, if the values of $r_2(i)$ are all from (0, 2) or all from (1, 3), the number of available beams groups for $i_{1,1}$ is no more than 8, and the number of bits for $i_{1,1}$ may be no more than $\lceil \log_2(8) \rceil$.

In some embodiments, if $N_1$=3, $N_2$=2, the total number of beam groups is $O_1$*$O_2$=16 and the total number of beams is $N_1$*$N_2$*$O_1$*$O_2$=96. There are 6 beams in each beam group for CBSR. The index of a beam group in the may be represented as {$r_1(i)$, $r_2(i)$}, wherein $r_1$=0, 1, ..., $O_1$-1, $r_2$=0, 1, ..., $O_2$-1, i=0, 1, ..., P-1. In each group, the beams are ($r_1(i)$*$N_1$+$x_1$, $r_2(i)$*$N_2$+$x_2$), $x_1$=0, 1, ..., $N_1$-1, $x_2$=0, 1, ..., $N_2$-1. In some embodiments, when P=4, the indices of the 4 selected beam groups {$r_1(i)$, $r_2(i)$} may be represent as {$r_1(0)$, $r_2(0)$}, {$r_1(1)$, $r_2(1)$}, {$r_1(2)$, $r_2(2)$}, {$r_1(3)$, $r_2(3)$}, respectively. And the number of available beams groups for $i_{1,1}$ is K and the number of bits for $i_{1,1}$ may be no more than $\lceil \log_2(K) \rceil$. In some embodiments, if the values of $r_2(i)$ are all from (0, 2) or all from (1, 3), the number of available beams groups for $i_{1,1}$ is no more than 8, and the number of bits for $i_{1,1}$ may be no more than $\lceil \log_2(8) \rceil$. In some embodiments, for i=0, 1, 2, 3, if all the values of $r_2(i)$ are same, for example, same as 0 or 1 or 2 or 3, the number of available beams groups for $i_{1,1}$ is no more than 6, and the number of bits for $i_{1,1}$ may be no more than $\lceil \log_2(6) \rceil$. In some embodiments, for i=0, 1, 2, 3, if all the values of $r_1(i)$ are same, for example, same as 0 or 1 or 2 or 3, the number of available beams groups for $i_{1,1}$ is no more than 12, and the number of bits for $i_{1,1}$ may be no more than $\lceil \log_2(12) \rceil$.

In some embodiments, if $N_1=6$, $N_2=2$, the total number of beam groups is $O_1*O_2=16$ and the total number of beams is $N_1*N_2*O_1*O_2=192$. There are 12 beams in each beam group for CBSR. The index of a beam group in the may be represented as $\{r_1(i), r_2(i)\}$, wherein $r_1=0, 1, \ldots, O_1-1$, $r_2=0, 1, \ldots, O_2-1$, $i=0, 1, \ldots, P-1$. In each group, the beams are $(r_1(i)*N_1+x_1, r_2(i)*N_2+x_2)$, $x_1=0, 1, \ldots, N_1-1$, $x_2=0, 1, \ldots, N_2-1$. In some embodiments, when P=4, the indices of the 4 selected beam groups $\{r_1(i), r_2(i)\}$ may be represent as $\{r_1(0), r_2(0)\}$, $\{r_1(1), r_2(1)\}$, $\{r_1(2), r_2(2)\}$, $\{r_1(3), r_2(3)\}$, respectively. And the number of available beams groups for $i_{1,1}$ is K and the number of bits for $i_{1,1}$ may be no more than $\lceil \log_2(K) \rceil$. In some embodiments, if the values of $r_2(i)$ are all from (0, 2) or all from (1, 3), the number of available beams groups for $i_{1,1}$ is no more than 8, and the number of bits for $i_{1,1}$ may be no more than $\lceil \log_2(8) \rceil$.

In some embodiments, if $N_1=8$, $N_2=2$, the total number of beam groups is $O_1*O_2=16$ and the total number of beams is $N_1*N_2*O_1*O_2=256$. There are 16 beams in each beam group for CBSR. The index of a beam group in the may be represented as $\{r_1(i), r_2(i)\}$, wherein $r_1=0, 1, \ldots, O_1-1$, $r_2=0, 1, \ldots, O_2-1$, $i=0, 1, \ldots, P-1$. In each group, the beams are $(r_1(i)*N_1+x_1, r_2(i)*N_2+x_2)$, $x_1=0, 1, \ldots, N_1-1$, $x_2=0, 1, \ldots, N_2-1$. In some embodiments, when P=4, the indices of the 4 selected beam groups $\{r_1(i), r_2(i)\}$ may be represent as $\{r_1(0), r_2(0)\}$, $\{r_1(1), r_2(1)\}$, $\{r_1(2), r_2(2)\}$, $\{r_1(3), r_2(3)\}$, respectively. And the number of available beams groups for $i_{1,1}$ is K and the number of bits for $i_{1,1}$ may be no more than $\lceil \log_2(K) \rceil$. In some embodiments, if the values of $r_2(i)$ are all from (0, 2) or all from (1, 3), the number of available beams groups for $i_{1,1}$ is no more than 8, and the number of bits for $i_{1,1}$ may be no more than $\lceil \log_2(8) \rceil$.

In some embodiments, if $N_1=2$, $N_2=2$, the total number of beam groups is $O_1*O_2=16$ and the total number of beams is $N_1*N_2*O_1*O_2=64$. There are 4 beams in each beam group for CBSR. The index of a beam group in the may be represented as $\{r_1(i), r_2(i)\}$, wherein $r_1=0, 1, \ldots, O_1-1$, $r_2=0, 1, \ldots, O_2-1$, $i=0, 1, \ldots, P-1$. In each group, the beams are $(r_1(i)*N_1+x_1, r_2(i)*N_2+x_2)$, $x_1=0, 1, \ldots, N_1-1$, $x_2=0, 1, \ldots, N_2-1$. In some embodiments, when P=4, the indices of the 4 selected beam groups $\{r_1(i), r_2(i)\}$ may be represent as $\{r_1(0), r_2(0)\}$, $\{r_1(1), r_2(1)\}$, $\{r_1(2), r_2(2)\}$, $\{r_1(3), r_2(3)\}$, respectively. And the number of available beams groups for $i_{1,1}$ is K and the number of bits for $i_{1,1}$ may be no more than $\lceil \log_2(K) \rceil$. In some embodiments, if the values of $r_2(i)$ are all from (0, 2) or all from (1, 3), the number of available beams groups for $i_{1,1}$ is no more than 8, and the number of bits for $i_{1,1}$ may be no more than $\lceil \log_2(8) \rceil$. In some embodiments, if the values of $r_1(i)$ are all from (0, 2) or all from (1, 3), the number of available beams groups for $i_{1,1}$ is no more than 8, and the number of bits for $i_{1,1}$ may be no more than $\lceil \log_2(8) \rceil$. In some embodiments, if the values of $r_1(i)$ are all from (0, 2) or all from (1, 3) and the values of $r_2(i)$ are all from (0, 2) or all from (1, 3), the number of available beams groups for $i_{1,1}$ is no more than 4, and the number of bits for $i_{1,1}$ may be no more than $\lceil \log_2(4) \rceil$.

In some embodiments, if $N_1=4$, $N_2=3$, the total number of beam groups is $O_1*O_2=16$ and the total number of beams is $N_1*N_2*O_1*O_2=192$. There are 12 beams in each beam group for CBSR. The index of a beam group in the may be represented as $\{r_1(i), r_2(i)\}$, wherein $r_1=0, 1, \ldots, O_1-1$, $r_2=0, 1, \ldots, O_2-1$, $i=0, 1, \ldots, P-1$. In each group, the beams are $(r_1(i)*N_1+x_1, r_2(i)*N_2+x_2)$, $x_1=0, 1, \ldots, N_1-1$, $x_2=0, 1, \ldots, N_2-1$. In some embodiments, when P=4, the indices of the 4 selected beam groups $\{r_1(i), r_2(i)\}$ may be represent as $\{r_1(0), r_2(0)\}$, $\{r_1(1), r_2(1)\}$, $\{r_1(2), r_2(2)\}$, $\{r_1(3), r_2(3)\}$, respectively. And the number of available beams groups for $i_{1,1}$ is K and the number of bits for $i_{1,1}$ may be no more than $\lceil \log_2(K) \rceil$. In some embodiments, for i=0, 1, 2, 3, if all the values of $r_2(i)$ are same, for example, same as 0 or 1 or 2 or 3, the number of available beams groups for $i_{1,1}$ is no more than 12, and the number of bits for $i_{1,1}$ may be no more than $\lceil \log_2(12) \rceil$.

In some embodiments, the terminal device may determine a third PMI based on the first and second PMIs and the second CBSR. The third PMI may indicates at least one wideband amplitude coefficient of a seventh number of beams determined based on the first and second PMIs and the second CBSR.

If, as described above, the available number M of values for $i_{1,2}$ and the available number K of values for $i_{1,1}$ are determined. According the second CBSR, 4 beam groups could be selected in the antenna array. The index of the selected beam group in the antenna array may be represented as $\{N_1*r\_1i+x, N_2*r\_2i+y\}$, $i=0, 1, 2, 3$, $x=0,1,2,\ldots,N_1-1$, $y=0,1,2,\ldots,N_2-1$. For a fixed value of x and y, and for i=0, 1, 2, 3, the number of beams in the selected beam groups whose amplitude is not zero may refer to as W. If W<L, there is no enough beams can be selected. In other words, the beams with value of x, y are not available and would not be selected. For a determined beam number given by $i_{1,1}$ and $i_{1,2}$, if Z is the number of pairs of (x,y) in the beam groups selected based on the second CBSR and satisfy W<L The number of available values for $i_{1,1}$, namely K, and the number of available values for $i_{1,2}$, namely M, may be further restricted by Z. In other words, the number of available values for $i_{1,1}$ is K−Z and the number of available values for $i_{1,2}$ is M−Z.

Figure 5:
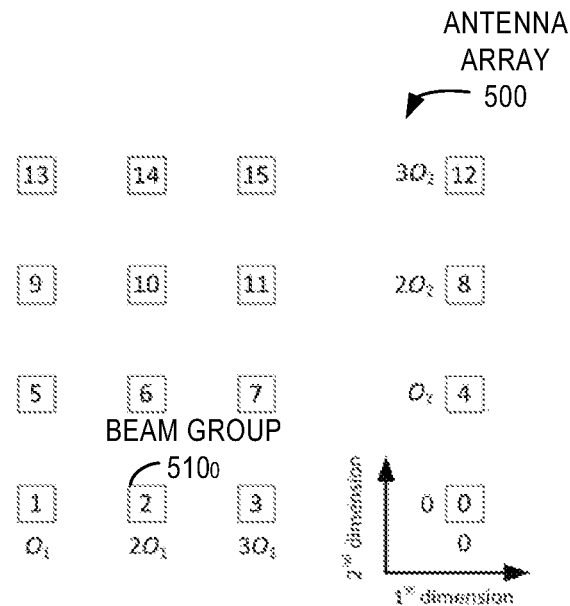
FIG. 5 shows an example of some embodiments of the present disclosure.

Usually, an interval of beams selected for one terminal device should not be very large. Thus, in some embodiments, the available number of beams from $N_1*N_2$ for $i_{1,2}$ may be restricted though determining a range of interval of the orthogonal beams in an antenna array. FIG. 5 illustrates an antenna array 500.

It can be seen from FIG. 5, in the antenna array 500, there are 16 beam groups. In different beam groups, the beams spaced apart from each other by $O_1$ are orthogonal to each other. For example, in a case of $N_1=4$, $N_2=4$, $O_1=4$ and $O_2=4$, a beam of beam group $510_0$ is orthogonal to the corresponding beam in other beam groups of the antenna array 500. Under normal circumstances, the available beams L are 16. If the interval of beams orthogonal to each other are restricted, for example, the interval $d=2\, O_1$, then the available beams L may be restricted to 9. For $i_{1,2}$, $$\left\lceil \log_2 \binom{N_1 N_2}{L} \right\rceil$$

may rewrote as $$\left\lceil \log_2 \binom{9}{L} \right\rceil.$$

Comparing with the value of $N_1*N_2$, the available number of the selected beams is reduced. The overhead feedback for $i_{1,2}$ may be reduced.

In some embodiment, the terminal device 120 may also determines a fourth PMI. The fourth PMI may indicate at least one subband amplitude coefficient of the seventh number of beams With reference to the table 1, $i_{1,4,1}$ may be regarded a wideband indication for amplitude coefficient of each beam in L beams and $i_{2,2,1}$ may be regarded a subband indication of phase coefficient for the beams from 2L−1 beams, whose wideband amplitude value are not zero, in a subband. For $i_{2,2,1}$, $M_l$ represents the number of beams having of non-zero wideband amplitude coefficients.

A CSI report may be include a first CSI part and a second CSI part. In general, considering the overhead of reporting the number of non-zero wideband amplitude coefficients $M_l$, $M_l$ may be reported to the network device in the first CSI part. In some embodiments, the wideband amplitude coefficients (that is, $i_{1,4,1}$) may be reported to the network device in the first CSI part. Thus, there is no need to report the number of beams having of non-zero wideband amplitude coefficients (that is, $M_l$).

The following Table 3 shows the mapping order of CSI fields of the first CSI part.

TABLE 3

Mapping order of CSI fields of one CSI report, CSI part 1

| CSI report number | CSI fields |
| --- | --- |
| CSI report #n CSI part 1 | CRI or SSBRI as in Tables 6.3.1.1.2-3/4/6, if reported |
| | Rank Indicator as in Tables 6.3.1.1.2-3/4/5, if reported |
| | Wideband CQI for the first TB as in Tables 6.3.1.1.2-3/4/5, if reported |
| | Subband differential CQI for the first TB as in Tables 6.3.1.1.2-3/4/5, if reported |
| | Indicator of the number of non-zero wideband amplitude coefficients $M_l$ for layer l as in Table 6.3.1.1.2-5, if reported |
| | RSRP as in Table 6.3.1.1.2-6, if reported |
| | Differential RSRP as in Table 6.3.1.1.2-6, if reported |

As mentioned above, for subband amplitude coefficients, the overhead depends on the number of non-zero wideband amplitude coefficients. However, even if some wideband amplitude coefficients are not zero, those wideband amplitude coefficients are not large enough. Thus, for those wideband amplitude coefficients, there is no need to adjust the subband amplitude coefficients.

In some embodiments, a threshold may be set to further the number of non-zero wideband amplitude coefficients. In some embodiments, the threshold may be any one of $\sqrt{1/64}$, $\sqrt{1/32}$, $\sqrt{1/16}$, $\sqrt{1/8}$, $\sqrt{1/4}$, $\sqrt{1/2}$ and 1. For the beams with wideband amplitude coefficient no larger than the threshold, there is no need of subband amplitude coefficient reporting. That is, the subband amplitude coefficient may be set to 1, and no reporting of $i_{2,2,1}$ and/or $i_{2,2,2}$. For example, for 8 possible values of wideband amplitude coefficients, namely 0, $\sqrt{1/64}$, $\sqrt{1/32}$, $\sqrt{1/16}$, $\sqrt{1/8}$, $\sqrt{1/4}$, $\sqrt{1/2}$, 1, respectively, threshold may be set to be $\sqrt{1/8}$.

Back to FIG. 2, at block 230, the terminal device 120 transmits the at least one PMI to the network device 120. For example, the at least one PMI is transmitted to the network device 120 via physical uplinks control channel (PUCCH).

It can be seen that, embodiments of the present disclosure provide a solution for reducing CSI feedback overhead. With the solution, by means of introducing CBSR to the feedback, the feedback overhead for PMI associated with $i_{1,2}$, $i_{1,1}$, $i_{1,4,1}$ and $i_{2,1,1}$ is significantly reduced.

Figure 6:
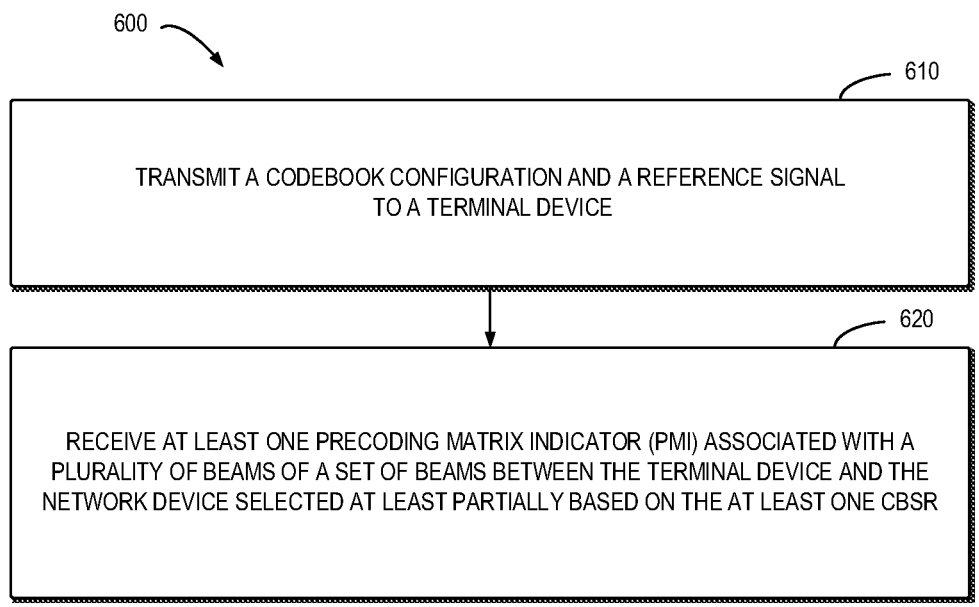
FIG. 6 shows a flowchart of an example method 200 for reducing CSI feedback overhead according to some embodiments of the present disclosure.

FIG. 6 shows a flowchart of an example method 600 for reducing channel state information (CSI) feedback overhead in accordance with some embodiments of the present disclosure. The method 600 can be implemented at a network device 110 as shown in FIG. 1. For the purpose of discussion, the method 600 will be described from the perspective of the network device 110 with reference to FIG. 1.

At block 610, the network device 110 transmits a codebook configuration and a reference signal to a terminal device, the codebook configuration indicating at least one codebook subset restriction (CBSR).

At block 620, the network device 110 at least one precoding matrix indicator (PMI) associated with a plurality of beams of a set of beams between the terminal device and the network device selected at least partially based on the at least one CBSR, the at least one PMI is determined based on the reference signal by the terminal device.

Additionally, in some embodiment, the network device 110 may determine a target beam from the at least one PMI, and transmit a signal to the terminal device via the target beam.

Figure 7:
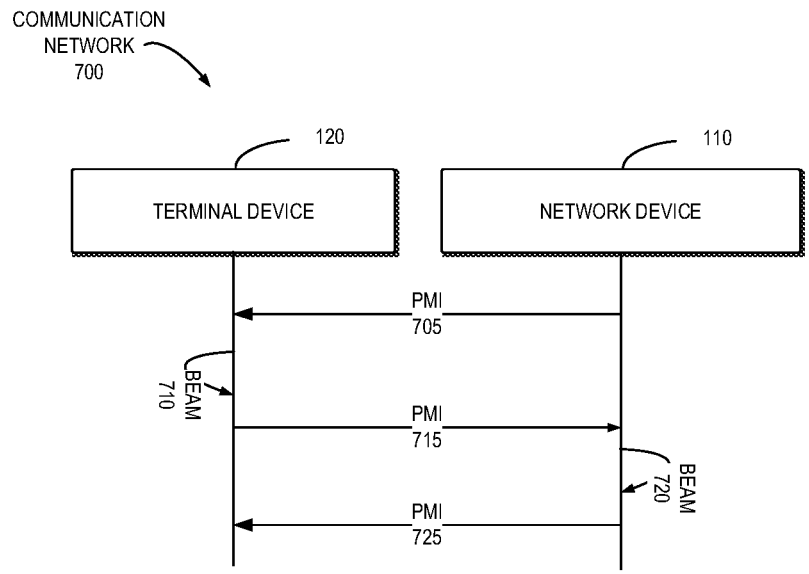
FIG. 7 shows a flowchart of an example method for reducing CSI feedback overhead according to some embodiments of the present disclosure.

In conclusion, principle and implementations of the present disclosure will be described in detail below with reference to FIG. 7, which shows a process 700 for UCI transmission according to an implementation of the present disclosure. For the purpose of discussion, the process 700 will be described with reference to FIG. 1. The process 700 may involve the network device 110 and the terminal device 120 in FIG. 1.

The network device 110 transmits (705) a codebook configuration and a reference signal to a terminal device 120. The codebook configuration indicates at least one codebook subset restriction (CBSR). Various parameter associated with channel configuration could be obtained by terminal device 120.

The terminal device 120 determines (710) at least one precoding matrix indicator (PMI) associated with a plurality of beams of a set of beams between the terminal device and the network device selected at least partially based on the at least one CBSR based on he at least one CBSR. For determining the at least one PMI associated with some certain beams or beam groups, the terminal device 120 obtains a number of antenna ports in a first and second dimensions of an antenna array of the network device 110 and oversampling factors corresponding to the number of antenna ports in a first and second dimensions of the antenna array of the network device 110 based on the RRC signaling received from the network device. Furthermore, the terminal device 120 obtains first and second CBSR.

The terminal device 120 transmits (715) the at least one PMI to the network device 110. The network device 110 determines (720) a target beam from the at least one PMI and transmits (725) a signal to the terminal device 120 via the target beam.

It can be seen that, embodiments of the present disclosure provide a solution for reducing CSI feedback overhead. With the solution, by means of introducing CBSR to the feedback, the feedback overhead for PMI associated with $i_{1,2}$, $i_{1,1}$, $i_{1,4,1}$ and $i_{2,1,1}$ is significantly reduced.

Figure 8:
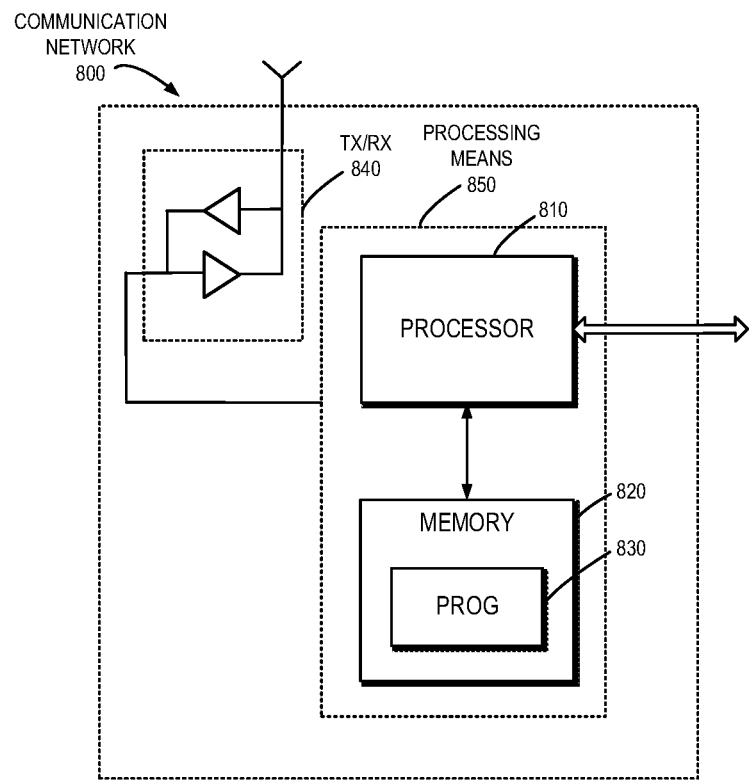
FIG. 8 is a simplified block diagram of a device that is suitable for implementing embodiments of the present disclosure.

FIG. 8 is a simplified block diagram of a device 800 that is suitable for implementing embodiments of the present disclosure. The device 800 can be considered as a further example implementation of a network device 110 or a terminal device 120 as shown in FIG. 1. Accordingly, the device 800 can be implemented at or as at least a part of the network device 110 or the terminal device 120.

As shown, the device 800 includes a processor 810, a memory 820 coupled to the processor 810, a suitable transmitter (TX) and receiver (RX) 840 coupled to the processor 810, and a communication interface coupled to the TX/RX 840. The memory 810 stores at least a part of a program 830. The TX/RX 840 is for bidirectional communications. The TX/RX 840 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 830 is assumed to include program instructions that, when executed by the associated processor 810, enable the device 800 to operate in accordance with the embodiments of the present disclosure, as discussed herein with reference to FIGS. 2 to 7. The embodiments herein may be implemented by computer software executable by the processor 810 of the device 800, or by hardware, or by a combination of software and hardware. The processor 810 may be configured to implement various embodiments of the present disclosure. Furthermore, a combination of the processor 810 and memory 810 may form processing means 850 adapted to implement various embodiments of the present disclosure.

The memory 810 may be of any type suitable to the local technical network and may be implemented using any suitable data storage technology, such as a non-transitory computer readable storage medium, semiconductor-based memory devices, magnetic memory devices and systems, optical memory devices and systems, fixed memory and removable memory, as non-limiting examples. While only one memory 810 is shown in the device 800, there may be several physically distinct memory modules in the device 800. The processor 810 may be of any type suitable to the local technical network, and may include one or more of general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 2 o 11 Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method implemented at a terminal device, comprising:
receiving a codebook configuration and a reference signal from a network device, the codebook configuration indicating a first codebook subset restriction (CBSR) and a second CBSR, wherein receiving the reference signal further comprises:
receiving a radio resource control (RRC) signaling from the network device;
determining, based on the RRC signaling, a number of antenna ports in first and second dimensions of an antenna array of the network device and oversampling factors corresponding to the number of antenna ports in the first and second dimensions of the antenna array of the network device; and
receiving the reference signal at least based on the number of antenna ports in the first and second dimensions of the antenna array of the network device and oversampling factors corresponding to the number of antenna ports in the first and second dimensions of the antenna array of the network device;
determining, based on the reference signal at least one precoding matrix indicator (PMI) associated with a plurality of beams of a set of beams between the terminal device and the network device selected at least partially based on the at least one of the first CBSR and the second CBSR; and
transmitting the at least one PMI to the network device.

2. The method of claim 1, further comprising:
obtaining the first CBSR from the radio resource control (RRC) signaling received from the network device, the first CBSR indicating a third number of a first beam groups selected from the set of beams and a fourth number of beams selected from the set of beams.

3. The method of claim 2, wherein determining the at least one PMI comprises:
determining, based on at least one of the first CBSR and the second CBSR and a number of antenna ports in first and second dimensions of an antenna array of the network device and oversampling factors corresponding to the number of antenna ports in the first and second dimensions of the antenna array of the network device, at least one of:
a first PMI indicating a group comprising a second number of beams selected from the fourth number of beams groups; and
a second PMI indicating a first number of beams selected from the group comprising the second number of beams.

4. The method of claim 3, further comprising:
obtaining the second CBSR from the RRC signaling received from the network device, the second CBSR indicating a fifth number of a second beam groups selected from the set of beam and a sixth number of beams selected from the set of beams.

5. The method of claim 4, further comprising:
determining, a third PMI indicating at least one wideband amplitude coefficient of a seventh number of beams determined based on at least one of the second CBSR and the first and second PMIs.

6. The method of claim 5 further comprising:
determining a fourth PMI indicating at least one subband amplitude coefficient of the seventh number of beams.

7. A method implemented in a network device, comprising:
transmitting a codebook configuration and a reference signal to a terminal device, the codebook configuration indicating a first codebook subset restriction (CBSR) and a second CBSR;
receiving at least one precoding matrix indicator (PMI) associated with a plurality of beams of a set of beams between the terminal device and the network device selected at least partially based on the first CBSR and second CBSR, the at least one PMI being determined based on the reference signal by the terminal device;
determining a target beam from the at least one PMI; and
transmitting a signal to the terminal device via the target beam.

8. A terminal device, comprising:
a processor; and
a memory coupled to the processor and storing instructions thereon, the instructions, when executed by the processor, causing the terminal device to:
receive a codebook configuration and a reference signal from a network device, the codebook configuration indicating a first codebook subset restriction (CBSR) and a second CBSR, wherein receiving the reference signal further comprises:
receiving a radio resource control (RRC) signaling from the network device;
determining, based on the RRC signaling, a number of antenna ports in first and second dimensions of an antenna array of the network device and oversampling factors corresponding to the number of antenna ports in the first and second dimensions of the antenna array of the network device; and
receiving the reference signal at least based on the number of antenna ports in the first and second dimensions of the antenna array of the network device and oversampling factors corresponding to the number of antenna ports in the first and second dimensions of the antenna array of the network device;
determine, based on the reference signal at least one precoding matrix indicator (PMI) associated with a plurality of beams of a set of beams between the terminal device and the network device selected at least partially based on the at least one of the first CB SR and the second CBSR; and
transmit the at least one PMI to the network device.

9. The terminal device of claim 8, wherein the instructions, when executed by the processor, further cause the terminal device to:
obtain the first CBSR from the radio resource control (RRC) signaling received from the network device, the first CBSR indicating a third number of a first beam groups selected from the set of beams and a fourth number of beams selected from the set of beams.

10. The terminal device of claim 9, wherein the instructions, when executed by the processor, cause the terminal device to determine the at least one PMI by:
determining, based on at least one of the first CBSR and the second CBSR and a number of antenna ports in a first and second dimensions of an antenna array of the network device and oversampling factors corresponding to the number of antenna ports in the first and second dimensions of the antenna array of the network device, at least one of:
a first PMI indicating a group comprising a second number of beams selected from the fourth number of beams groups; and
a second PMI indicating a first number of beams selected from the group comprising the second number of beams.

11. The terminal device of claim 10, wherein the instructions, when executed by the processor, further cause the terminal device to:
obtain the second CBSR from the RRC signaling received from the network device, the second CBSR indicating a fifth number of a second beam groups selected from the set of beam and a sixth number of beams selected from the set of beams.

12. The terminal device of claim 10, wherein the instructions, when executed by the processor, further cause the terminal device to:
determine, a third PMI indicating at least one wideband amplitude coefficient of a seventh number of beams determined based on at least one of the second CBSR and the first and second PMIs.

13. The terminal device of claim 12, wherein the instructions, when executed by the processor, further cause the terminal device to:
determine a fourth PMI indicating at least one subband amplitude coefficient of the seventh number of beams.

* * * * *